(12) United States Patent
Vavik

(10) Patent No.: US 6,946,989 B2
(45) Date of Patent: Sep. 20, 2005

(54) TRANSPONDER, INCLUDING TRANSPONDER SYSTEM

(76) Inventor: Geir Monsen Vavik, Kirkhaugen, Ovre Vikeraunet, N-7057 Jonsvatnet (NO)

(*) Notice: Subject to any disclaimer, the term of this patent is extended or adjusted under 35 U.S.C. 154(b) by 0 days.

(21) Appl. No.: 10/220,747
(22) PCT Filed: Mar. 1, 2001
(86) PCT No.: PCT/NO01/00079
§ 371 (c)(1), (2), (4) Date: Nov. 6, 2002
(87) PCT Pub. No.: WO01/67625
PCT Pub. Date: Sep. 13, 2001

(65) Prior Publication Data
US 2003/0137446 A1 Jul. 24, 2003

(30) Foreign Application Priority Data
Mar. 1, 2000 (NO) .............................. 1057/00
Jan. 9, 2001 (NO) .............................. 0192/01

(51) Int. Cl.[7] ............................................. G01S 13/76
(52) U.S. Cl. .............................. 342/51; 342/42; 342/57
(58) Field of Search .............................. 342/51, 42, 57; 455/336

(56) References Cited

U.S. PATENT DOCUMENTS

| | | | |
|---|---|---|---|
| 2,262,838 A | 11/1941 | Deloraine et al. | |
| 2,524,491 A | 10/1950 | Taylor | |
| 3,705,385 A | 12/1972 | Batz | |
| 4,143,324 A * | 3/1979 | Davis | 455/336 |
| 4,307,465 A * | 12/1981 | Geller | 375/319 |
| 4,393,514 A * | 7/1983 | Minakuchi et al. | 455/336 |
| 4,398,283 A | 8/1983 | Pottier | |
| 4,749,964 A * | 6/1988 | Ash | 331/107 A |
| 4,786,903 A | 11/1988 | Grindahl et al. | |
| 5,029,271 A * | 7/1991 | Meierdierck | 329/347 |
| 5,548,821 A | 8/1996 | Coveley | |
| 5,630,216 A | 5/1997 | McEwan | |
| 5,680,102 A * | 10/1997 | Xydis | 340/539.16 |
| 5,751,197 A * | 5/1998 | Boling, III | 331/107 A |
| 5,796,334 A * | 8/1998 | Chen et al. | 340/539.3 |

FOREIGN PATENT DOCUMENTS

| | | | |
|---|---|---|---|
| EP | 0435607 | 7/1996 | |
| JP | 10290123 A * | 10/1998 | H03D/11/04 |

* cited by examiner

Primary Examiner—Bernarr E. Gregory
Assistant Examiner—Isam Alsomiri
(74) Attorney, Agent, or Firm—Ladas & Parry LLP

(57) ABSTRACT

In a transponder (19) for amplification of a received signal (60) into an antenna (1), to a signal (61) for retransmission, and where the retransmitted signal (61) possibly may have information superimposed, a quenched oscillator (5) is incorporated as amplifying element. The oscillator (5) is preferably of superregenerative type and exhibits negative resistance (30) for the received signal (60). Transponders according to the present invention may be introduced as system elements in a wireless or wire based network to work as intelligent or unintelligent connections in the network. The transponders can also be used in positioning systems.

38 Claims, 12 Drawing Sheets

TRANSPONDER, INCLUDING TRANSPONDER SYSTEM

INTRODUCTION

The present invention concerns transponders of the general type as explained in the preamble of the appended claim 1, the application of such transponders in networks, as well as transponder systems in networks as given in the preamble of the appended claim 33.

BACKGROUND

In a transponder a radio frequency signal is transmitted to a transponder, which in turn retransmits the signal, often in modulated form, that is to say with superimposed information from the transponder. The purpose of a transponder may thereby be partly to act as a signal repeater, partly exchanging information with the transponder. Some transponders work indirectly, others directly. In indirect retransmission, the signal is received and retransmitted in sequence. Retransmission may be desired to take place in a frequency band different from the band for received signal. One example is aircraft transponders for DME. In direct retransmission the signal is transmitted simultaneously as it is received, in the same band. Here, the conversion- and modulation-gain of the transponder is utilised. Examples are RFID TAGs. In the lastly mentioned case the transponder acts as an amplifier, often with very small or negative amplification. Such transponders therefore, serve few applications within the various areas of wireless communication and radio navigation.

A transponder is in many cases in addition to retransmission (up link) also required to receive information (down link) to identify itself and act on commands. Applications that use transponders are therefore often named RFID systems (Radio Frequency IDentification). It is frequently required that the transponder is portable, lightweight, compact, simple and carries few components, is inexpensive to manufacture and has several years of battery life, at the same time as available performance margins become inadequate, especially with respect to communication range. At the same time, requirements of large communication bandwidth and multi channel operation are present. It is often required that transponders have coherent retransmission, either with respect to an interrogator or a phase measuring station when the transponder is to be positioned as well.

The most commonly used principle for transponders is the so-called reflective principle. It works with a RF carrier from a beacon or interrogator received by an antenna, which is coupled to a high frequency diode that in turn is modulated by the signal, to be retransmitted to the interrogator by the transponder. Usually the aim is to achieve phase modulation, which is easily accomplished by having a diode switching the refection coefficient in the antenna connection terminals. The resulting modulation will always be a combination of amplitude modulation and phase modulation with no significant performance reduction. The retransmitted (up link) side bands are coherent with the incoming signal, and the interrogator works by the homodyne principle. To avoid cancellation between side bands, single side band reception with side band cancellation is used in the interrogator.

Reception (down link) in transponders is accomplished with the mentioned diode or a dedicated diode demodulating the high frequency signal from the antenna directly, without high frequency amplification. High frequency amplification is not used, mostly on account of power consumption. The sensitivity acquired is therefore limited, but may be well tuned to the transponder dynamics achieved with the reflective principle.

The disadvantage with the reflective principle is that the retransmitted signal level only can be amplified by the help of antenna gain. Too much antenna gain is unwanted, because high antenna gain gives too narrow antenna lobes and consequently pointing errors, and the result may therefore become losses in stead of gain.

In a few existing transponders, active amplification is introduced, that is active high frequency or microwave components, to achieve this. With conventional technology this comes with high costs in the form of high power consumption and costly products. Power consumption becomes high because unconditionally stable amplifiers are required. Cost becomes high because this, on microwave frequencies, usually is accomplished with microstrip technology and expensive circuit board laminates. The amplification achievable is very limited due to current draw and because it is difficult to sustain sufficient isolation between transmitter and receiver in low cost products. This implies that such solutions preferably must carry separate transmitter and receiver antennas. Benefits of such solutions are usually not worth the increased cost, and the majority of such products today therefore have passive microwave modules, that is just one diode or a transistor switch. The solutions are likely to require a limiter which serves to limit the transmitted level below the maximum allowed level according to the respective code or standard for the application of the transponder. Limiter and filter may also be required to achieve necessary suppression of harmonics of the modulation frequency. Harmonics of the RF carrier are often very difficult to suppress sufficiently to meet standard requirements. Transponder range for the transponder solutions mentioned is very limited, because the outgoing signal amplitude is nearly proportional to the incoming signal amplitude as a consequence of no or little active high frequency amplification in the circuit. Such amplifying transponders therefore have seen few applications within the various areas of wireless communication and radio navigation concerned.

Some known systems concerning interrogation of sensors or various types of platforms that require a low current, simple transponder, have effective solutions for down link in the transponder, while the up link is comprised by one or more oscillator functions. A significant disadvantage with this solution is that it will require a crystal oscillator for the transmitter if the purpose is not served by the poor frequency stability and calibration otherwise resulting. Such a transponder is not usable in a homodyne system unless it carries a phase locked loop (PLL) frequency locked to the interrogator.

It has been shown that transponders may be realised as simple, injection locked oscillators. These have specifications that seriously limit their applications. The injection locked oscillator is in principle any type of oscillator circuit where oscillator stability purposely is made dependent on no outside noise or an injected CW signal (see below) which is closely equivalent to the oscillator frequency to give frequency locking. The circuit is compensated for temperature and other types of instabilities. The frequency spectrum of an injection locked oscillator unlocked and with no signal in as well as locked to a signal in, appears as the spectrum of an ordinary oscillator with a CW carrier. With an in signal and out of lock it will have a typical, strong phase noise on one side of the carrier frequency. As mentioned, the largest disadvantage of the injection locked oscillator is a very narrow lock frequency band and a very low sensitivity. The advantage is low phase side band noise. There is a need for a technology, which improves the injection locked oscillator and expands the applications there of. One example of injection locked oscillator application is in phased antenna arrays, but there, as well, the usefulness is limited on account of narrow locking bandwidth which typically will be some ten thousandths of the carrier frequency, and in addition a CW signal is required. (In the following text, the term CW is both used for a RF carrier, which is either continuos or pulsed. This is in line with the conventional literature, although CW carrier actually is supposed to mean "continuous wave". Physically speaking, a continuous wave cannot exist in reality. "Quenched oscillator" is used meaning an oscillator, which is quenched with a repetitive function with frequencies from kHz to MHz). It has been shown, see U.S. Pat. No. 3,705,385, how an injection locked oscillator may be improved, especially with regard to locking bandwidth, with so called quenching, that is switching of the oscillator. Still, the locking bandwidth is narrow, typically some thousandths of the carrier wave frequency, and still a CW signal is required, often limited to FM modulated CW, to allow signal repetition to work satisfactorily. Besides, the locking is heavily dependent on the signal dynamics and will generally only work for strong CW signals. It appears that one has believed it necessary that the carrier frequency itself had to be locked in order for a number of transponders to work together without interference. That may have been a cause for the super-regenerative principle to have been overlooked for such applications, see below. Another reason is that it is a far more difficult challenge to make a quenched oscillator work according to the intention in superregenerative mode than in injection locked mode, due to added component requirements besides design challenges. This follows from the fact that superregenerative function generally occurs or is effective only in a narrow region of the bias characteristic for the oscillator, while the injection locked function occurs across a large part of the remaining characteristic. This is little or not discussed in publications about SG applications. In addition, the quench frequency is often injected in such a way that the superregenerative dynamic range is severely limited, which again shows how poorly the circuit was analysed. It has not been shown earlier how unwanted emission of signals and inter- and cross modulation products should be reduced in order for a quenched oscillator to work in accordance with standards. Development in component technology has additionally made it possible to utilize the superregenerative principle better, with very low power solutions, to assist innovations using this principle. The quenched, injection locked (=locked) oscillator has, as explained herewith, specifications that iimply large limitations with respect to signal dynamics and bandwidth and further disadvantages like reliability, that reduce possible applications. This is proven by the fact that earlier publicised and patent text technologies having failed to succeed in applications (i.e. see U.S. Pat. No. 3,705,385), which is due to several factors, some of the more important ones being unreliable frequency locking and narrow useful information bandwidth in the kilobaud range. Such bandwidth is mostly rather uninteresting for today's communication technologies. Additionally, it is not evident from subsequent patents and publications if anyone made serious attempts to improve the technology or widen the scope of the use of narrow band, locked oscillator.

There is a need for finding alternative solutions to known transponder technology that uses "on board" oscillator.

There is a need for a transponder technology which achieves to combine simplicity with existing, reflective transponders with wide bandwidth, high performance, stability, power efficiency, production applicability and that in addition allows simple and cost effective implementations in microwave ASIC (customer specified integrated circuit) or MMIC (microwave integrated circuit). There is also a significant need for a new technology where the performance of transponders exceed minimum requirements so that margins and production compatibility are increased and to allow microwave transponder systems to be realised with less expensive substrate technologies and without the use of micro strip.

Common uses of transponders are sensor systems, control systems, medicine and in RFID systems. An example of the use of sensor systems is the need to improve existing technology for surveillance, control and communication in power distribution in high and low voltage power line distribution systems. An example of control systems is measuring and actuating tasks in processes, both in- and out-door. An example of medical usage is the application of sonds and sensors in medical scientific research. An example of RFID usage is given by the need for identifying and communicating with objects, persons and vehicles on long range. One application for simple transponders in RFID which include long range, is radio tagging of animals, where limited range for today's transponders makes them less suitable and therefore other technologies are used like pulsed beacons that renders less service per carried energy unit because continuos transmission is required. Long range may be defined as from ten meters to several kilometers. One widespread application with RFID is intelligent and unintelligent "tags" for identification, access pricing and payment etc. Transponders for different application areas are most likely to use frequencies between 30 MHz to over 10 GHz. In toll road systems and similar, microwave bands 2.45 GHz and 5.8 GHz and more are used.

Nodes in some signaling networks or data communication networks may be regarded as indirect repeaters. Examples of such are cellular phones, or mobile systems (i.e. GSM, GPRS, UMTS, TETRA). If nodes or stations in such systems are to be used for retransmission, it leads to a significant reduction in information bandwidth, usually reduces to half. The same applies to nodes in Wireless LAN, Bluetooth and other wireless data communication networks. This seems to be the reason for repeating functions usually not being implemented in the mentioned systems. There is a significant need for a new system, which is compatible with existing, and future, wireless network and communication systems and which is able to repeat signals in both directions. There is also a need for inexpensive and effective technology in nodes for such networks, which is also able to perform repeating functions without reducing bandwidth from the repeating function. In some cases there will be needs for the transponders to act intelligently.

The evolution of radio based, wireless networks for large bandwidths that is required to use very high frequencies (10–200 GHz) have been hampered by the fact that it is still too expensive to implement transmitters, receivers and transceivers. Up to now, it has not been possible to realise a simple transponder with large dynamics for such frequencies. At the same time, there is a need for implementation of inexpensive, local wireless networks with large bandwidths of more than 100 Mbit/s. There is a great need for a system technology, which allows inexpensive networks in the cm and mm wavelengths.

In wire and cable based communication systems the same as for wireless systems is valid. Line amplifiers are expensive to realise and often they can amplify the signal in one direction only. Examples of line amplifiers that are bi-directional are older type amplifiers for phone lines that exhibit low amplification and can only be used for low frequencies. Examples of the amplifiers that have high amplification, but are unidirectional are cable TV amplifiers used for data communication. For high frequency it has been possible to make line amplifiers with limited isolation between the amplifier input and output, with resulting low useful amplification and therefore applications are very limited. It is therefore a need for a new principle of amplification of signals along a signal cable with the help of simple methods implying small or no modifications to the system.

Within positioning, radio navigation and distance measurements, coherency and controlled phase relationships are desired parameters. An example is hyperbolic positioning systems where the phase of the measured signal must be determined by clock regeneration. This puts strict requirements on real time processing and filtering, and often reduces the update rate of the system. In many positioning systems for short and medium ranges there is a need for a transponder technology which will work effectively and which retransmits signals with known phase. Applications would be in objects to be positioned or as parts of known infrastructure of the system to improve the measurement geometry of the system. Until now, such transponders have been too expensive to make or have not been realisable. There is also a need for an inexpensive, low power and effective transponder technology, which may increase the usage of radio positioning by positioning people, belongings a.s.o. For recovering purposes there is also a need for an inexpensive and more efficient and useful technology for transponders.

In power line surveillance and communication there used to be a need for series connected amplifiers (line amplifiers) in the lines or cables to compensate for signal losses. This has been excessively expensive and may cost tens of thousands of US dollars per connected unit. It follows that there can be only a small number of amplifiers along the lines, resulting in a very low communication bandwidth. Likewise, it is expensive and complicated to bypass transformers and other infrastructure in the power network for communication signals. It exists therefore a need for a new principle of amplification of signals along the power line network with the aid of simple methods that require minor or no modifications of existing installations, and which makes it possible to realise far wider transmission bandwidths and better flexibility. With known technology it is not possible to have distributed surveillance along a power line and existing solutions therefore use expensive, widely spaced installations that use radio communication. There if therefore a need for a new technology which integrates all types of surveillance and control in any position in the power line network, with two way communication along the power lines.

In power line surveillance and communication on the distribution circuits, where data communication is to include so called access networks for broad band distribution and other communication wtih clients, the communication range will be limited to 100 to 300 meters due to signal losses. Line amplifiers are very expensive to realise and install and indirect repeaters reduce the data bandwidth. Consequently it is often difficult to transmit signals between clients and other units like routers, masters and hubs. With known technology there exists no solution, which in a simple and inexpensive way can relay signals without galvanic coupling passed embedded separations in a power network, i.e. a transformer station. It exists therefore a need for a new principle for amplification of signals in electricity networks used as access data networks employing simple methods requiring small or no modification of the infrastructure.

In communication systems of different kinds, local shadow zones will easily occur. This is particularly true in mobile communications as with GSM, GPRS, UMTS, TETRA and more. Here, it has until now been impractical to realise inexpensive transponders or repeater systems to amplify the signals in a simple manner and in such a way fill in coverage holes or shadow zones. Known technology did not achieve the necessary signal amplification and one therefore was obliged to install an additional base station to serve a coverage hole area. Such insufficient coverage therefore had to be accepted as along roads, within buildings, ships, ferries and so on. Power lines are found along roads that could function as carriers or hosts for small transponders and could also power them as an example with inductive transmission of the moderate energy required. With known technology, it is neither easy nor cost effective to couple shielding rooms in buildings, ships a.s.o. to the outside world to achieve radio coverage. By this reason, there is a need for a new principle of amplification of signals in systems for mobile communications with the help of simple and inexpensive methods that requires little energy. Correspondingly, there is a great need of a new technology that allows simple signal repeating or signal amplification for radio applications within systems and equipment for broadcasting and communication. This is particularly true for local, geographic are as. In other communication systems where passive RF technology or low transmitting power is used, like in RFID tags, the margins often are small giving communication problems from changing conditions of various kinds. There is a significant need for an inexpensive, energy efficient transponder technology that easily can amplify signals in both directions that as an example could be installed on r near such a low power device. In this case, it seems logical to name the transponder a "signal booster". In optical signal transmission systems there may be a need as well for a new technology that in the same manner as the super regenerative principle with radio waves and by loose coupling to an optical waveguide or other optical medium, amplifies the signals.

SUMMARY OF THE INVENTION

It is therefore a main object of the present invention to provide transponders and transponder systems where the known disadvantages with transponder systems by large are avoided, and where new and easy to implement applications of transponder systems is made possible.

It is further a main object of the present invention to provide a very universal and at the same time inexpensive and energy efficient system for repeating RF signals, on a single or multiple basis, based on a single or a number of super regenerative transponders that are easy to install and power, and that require minor or no modification of existing other communication technologies or infrastructures or equipment, and thus making wireless and wire bound network systems with quite new signal ranges, bandwidths, specifications and applications realisable for existing technologies and infrastructures of communication.

Another object of the present invention is also to provide means of realising new types of communication systems based on the simplicity and high performance of the present invention that otherwise would not be possible or would be too costly to realize.

It is yet another object of the present invention that it should work for both direct and indirect repetition of signals, one or two-way communication and for interrogation.

Another object of the present invention is to function both when frequency bands for up link and down link are equal as well as when they are different. It is further an object of the present invention that it should function both when signal dynamics up link and down link or in different directions are equal and when they are different.

THE INVENTION

Several of the objects of the invention are achieved, in a first aspect, with a transponder as given in the appended claim 1. Further, advantageous characteristics are given by the attached dependent claims.

Further stated objects, are achieved in a second aspect, with a transponder system as given in the appended claim 33.

Further characteristics of the system are given by the dependent, attached claims.

Completely independent of the way the first aspect of the invention is realised in detail, the principle of the invention may be described as a quenched oscillator, possibly of the super regenerative type, and preferably as a one port with negative resistance.

The most evident characteristics of the invention are a simple transponder that exhibits extraordinarily high conversion gain and the invention with corresponding performance may retransmit an amplified version of a received signal. The quenched oscillator shows CW self oscillation during the active part of the period of a quench signal that controls the oscillator. Locked oscillator is a special case of quenched oscillator that is optimised for locking and that has better locking characteristics than a none quenched, injection locked oscillator. The working principle in locked condition is equal to that of the injection locked oscillator, but with the amplification in the oscillator that occurs before it oscillates during each quenching period increasing the locking bandwidth substantially. The none-oscillating, active part of the quench period gives it better characteristics as an amplifier that that of the injection locked oscillator. This amplification depends on frequency locking. With no in signal it has a high frequency CW self-oscillation on a given frequency during each quench cycle. With no signal in, it is characterised by having a high frequency spectrum which contains a decaying comb of subcarriers on each side of the main frequency, with separations equal to the quench frequency. The phase noise is also acceptable. With no signal in and locking, the frequency spectrum looks correspondingly, and the phase noise is still acceptable. But with signal in near the carrier and without locking, it will normally exhibit strong phase noise on one side of the carriers, corresponding to an injection locked oscillator with similar conditions. The disadvantages of quenched oscillator in locked condition are that loss of locking and phase noise may occur. As an amplifier the self-oscillation will always give interference for signals that do not achieve locking. Quenched, locked oscillator has some advantageous characteristics. This mod is easy to realise and will work across a large part of the oscillator bias characteristic. Because it may be realised with a high-level oscillator bias, relatively high output power levels are achievable. Frequency locking increases conversion gain and implicit amplification, but at the same time severely limits information bandwidth and modulation types useful. Utilisation of quenched oscillator that is out of lock in a transponder is not known. Example of known technology using a special case of quenched oscillator is U.S. Pat. No. 3,705,385 showing a locked oscillator where the working principle is depicted by the shown frequency spectrum (FIG. 11a) including FIG. 11b for "Locked Oscillator Transmission Spectrum". The ratio between carrier frequency and quench frequency is in excess of 1e3. These figures also serve to show that it describes an invention for narrow band applications suitable for a few kilobauds. It is evident from FIG. 11b that during the quench cycle the oscillator goes into "uncontrolled oscillation" which, is the oscillating part of the characteristic where injection locking occurs.

There is a need for a new technology that improves the performance and applicability of the quenched, locked oscillator. There is also a need for a technology that utilises the quenched oscillator generally, especially for wide bandwidths.

The super regenerative oscillator or amplifier is also a quenched oscillator. But because the super regenerative oscillator does not have CW self-oscillation, we should regard it as an independent technology. The super regenerative oscillator working principle is characterised by not achieving full oscillating conditions during a quench cycle when it has no in signal. This implies that it has no CW self-oscillation, but may have diffuse (broad band) oscillations that necessarily do not reduce quality of SG amplification. The part of the quench cycle where amplification is achieved is hereby substantially larger that with the locked oscillator and may reach 50%. The importance of the improvement of the duty-cycle is largely neglected in literature and patents. This, in combination with no present CW self-oscillation to give ringing or compression, gives the super regenerative oscillator superb amplification characteristics. It does not have the interference problems typical of the quenched oscillator with CW self-oscillation. It is typical of an oscillator operating in stabile super regenerative mode with no in signal to show a frequency spectrum with negligible or little systematic noise. Systematic noise caused by diffuse oscillations, when present, may occur quite asymmetrically, with spacing equal to quench frequency and will resemble white noise. Depending on the way SG oscillator is implemented, the frequency spectrum of the oscillator response may be symmetrical or asymmetrical and may have distinct lobes or no lobes. The frequency spectrum response of the SG oscillator characterises its abilities as amplifier. In known publications and patents where SG is used for receiving purposes, this fact is not pointed out or is left neglected. These are among the relationships that work together to make the SG oscillator a more complex technology to master, even if the circuit complexity remains very simple compared to solutions based on super heterodyne principles which, in many cases are not useful.

The transfer function of a super regenerative oscillator as amplifier is independent of frequency or phase locking of a high frequency CW carrier. Instead of locking bandwidth one may state bandwidth factor for the SG oscillator. The bandwidth factor is best served by the definition response bandwidth divided by centre frequency where the response bandwidth is defined from signal to noise ratio for a weak signal with a given amplitude and frequency variable.

The transponder according to the present invention may be regarded high frequency wise as a one port giving from large to extremely large amplification. Thereby it is stated that the signal path in and out is exactly the same and that only one antenna is required. Since being a one port, the isolation between input and output is undefined and may be regarded as infinitely high. The amplification is only depending on Q-factors in resonant circuits and on the stability criteria of the active device, and may therefore become extremely large. The dynamic range is otherwise only limited by the power limitations of the active component and by the bandwidth and noise figure of the complete circuit. When it is realised for large amplification this results in a transponder according to the invention where the retransmitted signal has nearly constant amplitude. Generally a received signal will be retransmitted with or without added modulation. The transponder in accordance with the present invention may also be modulated for purposes like interrogation. As a modulator or mixer the transponder according to the present invention has positive and exceptionally high conversion gain. It means that a dedicated limiter to keep transmitted level within requirements of standards is not required. Maximum range may thereby become from significantly improved to multiplied as compared to today's transponders. Because modulation may be generated at low levels, harmonics within the communication band will be satisfactorily attenuated to meet rigid requirements in standards without having to use complex filters. Due to loose coupling between antenna and transponder and to the coupling otherwise being selective, unwanted signals in harmonic bands of the communication band will be easy to attenuate.

The transponder according to the first aspect of the present invention makes it easy to accomplish, in a simple manner, reception of data signals with high sensitivity and low power consumption. The demodulated, amplitude modulated information signal will attain a level which is substantially amplified by the transponder according to the present invention, and the transponder therefore gives far higher sensitivity as compared to a receiver using a simple diode front end.

The transponder according to the present invention makes it feasible to simplify existing fixed or mobile interrogation systems that require a large communication zone. The high performance transmission function allows therefore, a significant reduction in physical size of especially fixed installations with resulting environmental benefits. Portable interrogators may become more compact and more feasible to design.

With transponders that work according to the super regenerative principle the initially mentioned transponder problems are solved. With the new technology both signal amplification, indirect repetition, transmitting, receiving and interrogation can be realised cost effectively and efficiently. The super regenerative transponder is a switched oscillator as well, but operates in a different mode to injection locked oscillator and special requirements must be met for it's full potential to be utilised as in the present invention. But when these conditions are satisfied, the super regenerative circuit has superior advantages and cannot in any important area be replaced by injection locked oscillators. The super regenerative principle is therefore far more useful for practical purposes. The super regenerative transponder may in principle work as a one port amplifier with high amplification and works equally well across a very wide frequency range which may include a number of signals, as opposed to a locked quenched oscillator as in U.S. Pat. No. 3,705,385. Locking or synchronising of quench frequency, when it is called for, is possible over a far larger dynamic range than the locking of carrier frequency in locked oscillator types, and means by example that substantially high attenuation between transponders in a chain is allowed. Th super regenerative oscillator or transponder also be regarded as a "sampling oscillator" where the quench frequency may be regarded as a sampling frequency. The utilisation of the super regenerative characteristics in this way is new because such transponders could not be realised at low costs with other technologies. The super regenerative principle has been poorly understood and publicised and patented versions of the super regenerative principle, mainly for reception application, show that the function is poorly understood and inadequately implemented. One example is insufficient descriptions and solutions concerning the importance of screening and filtering of the quench frequency to isolate the input of the super regenerative circuit to avoid harmonics ruining it's dynamic range. This is a decisive parameter in order to fully utilise the super regenerative principle as in the present invention. In stead it is often stated that the quench frequency has an upward limit of 1e3 to 1e4 part of the carrier frequency (centre frequency). The quench frequency has a decisive influence on the transponder performance and must often be chosen as high as possible in accordance with bias and the quench cycle function. Reverse bias during part of the quench cycle permits higher quench frequency. The quenching frequency may be injected at several point in the SG oscillator to achieve desired characteristics.

The super regenerative transponder is an oscillator but without a stable oscillation unlike the injection locked oscillator types. Its active component may have an input and output which in many cases results in a two port. But the output is always part of the feedback loop and affects the phase change in it, and therefore does not necessarily interfere with the input. SG is the only known circuit that may be realised with active components in such a way that extremely high amplification (40 to 100 dB) is achieved across a wide frequency band and for a number of various signals while at the same time the output to input isolation does not affect feasibility. This is in sharp contrast to other technologies that typically will only achieve a maximum of 20 dB of amplification. Additionally, it allows low cost implementations and can be reproduced with large tolerances. The circuit comprises a signal booster or a direct repeater, but may also work as an indirect repeater or transmitter-receiver device (transceiver) by injecting a carrier from en external source while it is likely to be modulated. The circuit is also characterised by possibly often being the only feasible way of realising transmitter-receiver devices (transceivers) at very high frequencies (cm and mm bands).

It is known that voltage controlled oscillators (VCO) and injection locked oscillators can be realised using RC coupled oscillators. Such oscillators have wide locking bandwidth. It is until now not shown that super regenerative oscillators may be realised using RC networks that are without inductors and resonators. For use in super regenerative transponders this is of special interest because it may make it feasible to implement super regenerative transponders in the lower part of the RF spectrum with great bandwidth factors.

As an example it is possible to achieve super regenerative function across typically 10 MHz using a simple super regenerative oscillator in the frequency range 4–30 MHz where a number of types of protocols and modulation types for broad band access communication over power line distribution are used (OFDM, DSSS and more).

The present invention may be realised using RC networks instead of LC, LCR, ceramic, dielectric, piezo or SAW networks in the SG oscillator. The main application here is in the lower part of the RF spectrum where great bandwidth factors are required, in example 1:5. This may be achieved using RC circuits and possibly a number of oscillators in parallel with overlapping frequency ranges.

Further embodiment of the present invention in order to achieve high quench frequency is to inject primary quench at several points in the oscillator circuit.

Examples of numbers that explain the superiority of the present invention as opposed to applied, known technology in transponders are passive transponders of the reflective type or modulated reflector that are likely to show current draws in excess of one milliampere and conversion gains minus antenna gain of typically −6 dB. With the present invention the corresponding net gain may reach 40 to 100 dB depending on bandwidth and quench frequency with a current draw of less than a milliampere. It is therefore easily seen that the present invention is revolutionary for many existing applications and a key to novel uses.

One reason that quenched oscillator and super regenerative oscillator have been overlooked for modern applications is likely to be found in the fact that patents and publications describing quenched and especially SG oscillator have focused on micropower applications and presumably have anticipated very short communication ranges. It appears one has failed to realise that SG in principle may be used with any level of power as the present invention is based on. That makes great communications ranges possible both with single and co-operating transponders. The fact that SG oscillators spread their energy across a wide frequency range with potential interference problems has undoubtedly been seen as a disqualifying characteristic whilst the present invention either gives solutions to that particular characteristic or makes use of it.

Completely independent of in which way the present inventions second aspect is realised in detail, the principle of the second aspect may be described as a communication system comprising one or more transponders of the quenched type. The use of quenched, possibly super regenerative transponder offers, as mentioned before, large amplification achievable in an efficient, simple and low cost manner without the need of isolation between input and output and allows the transponders to work properly with small antennas or, in wire bound networks without need of galvanic coupling to lines or cables. Stray capacitance may often suffice as a satisfactory link of the coupling of transponders in the present invention and will be more efficient with higher frequencies. The use of super regenerative transponder in the present invention makes large amplification of a signal achievable without the need for frequency conversion of the signal or the use of directivity. Regardless, directivity may be used to combat echoes, standing waves and multipath transmission, for instance in wireless systems where twodirectional antennas may be used. In wire bases systems the same is valid and directional couplers may be introduced. The high amplification and independence of input to output isolation of the present invention makes it possible with simple realisations of directional couplers based on loose coupling, usually inductive at lower frequencies and as transmission line couplers on higher frequencies. Transponders according to the present invention may use carrier with double sideband, carrier with single sideband or just single sideband. Reception and retransmission in such a manner is determined by filtering in the transponders and optionally by modulation in the transponders. Choice of sideband may be used as a simple means of frequency conversion to optimise a network or adapt the transponders to existing technologies. Quench frequencies of the systems that are parts of the present invention for direct repetition of signals and with several super regenerative transponders must, with respect to interference comply with stricter demands on frequency stability than transponders using indirect signal repetition, that is where the information is received and retransmitted in sequence. The type of modulation to be transmitted (FSK, PSK, QPSK and so on) determines how strict the demands are. A fundamental difference in technical realisation as opposed to locked oscillators is the absence of the out of lock conditions with the super regenerative principle, even though the super regenerative transponder in many cases must have phase locking on quench frequency. The difference being that the quench frequency is much lower and that the locking may take place with much less loop bandwidth and consequently simple circuits solutions. Injection locked quench oscillator of the RC type, crystal or ceramic is such a simple solution. The quench frequency in the transponders may be controlled by a very stable frequency source in each transponder or frequency and phase locked to a common signal distributed on the network or locked to each other (self locking quench generator). Frequency and phase locking of quench generator will, even with such simple solutions work across a large dynamic range, as a rule right down to the intrinsic noise level of the transponder due to implicit high loop gain and relatively narrow locking bandwidth. The various transponders of the present invention may be intelligent and may execute other tasks than just relaying the received signal. The various transponders may also work as connection nodes of the network that is to say that the information may be transmitted both directions through the transponder i.e. with a PC or a sensor platform.

Up link and down link may have different transponder devices. For one direction it may be necessary to use a different bandwidth or power range than the other. Two or several transponders can be combined in one unit.

A number of transponders in the present invention may be connected in parallel directly or indirectly to increase dynamic range of bandwidth or both. The present invention, therefore, has theoretically very generous limits for achievable bandwidth and dynamic range and the theoretical values may be closely approximated by practical solutions.

The present invention therefore allows the signal repetition to pass successively through a small or high number of transponders to achieve long range without loosing useful signal dynamics or information bandwidth. When, echoes, standing waves or multipath is a problem, as an example for large information bandwidths, it is possible with the present invention to introduce directional sensitivity due to the large amplification which, may be utilised for the different transponders to handle different transmission directions. The present invention therefore may be designed so that each repetition device comprises a transponder system for each of the two transmission directions.

To achieve a large dynamic range, high sensitivity and large bandwidth with the super regenerative transponders in the present invention it is important how the quench signal is injected, both with regard to where it is injected and how it is filtered. This may be accomplished in various ways as long as measures are taken to avoid harmonics of the quench frequency reducing the dynamic range of the transponder. A specific way of accomplishing this is a design with a super regenerative circuit having both in and output where the input is the most sensitive signal terminal and to supply the quench signal to the output, where the circuit is least sensitive to incoming signals. One embodiment of such implementation of the present invention is to supply the quench signal via bias through a, for the purpose suitable filter and thereby benefit from the implicit isolation between input and output present in the amplifying element. In this way improved dynamic properties are achieved and increased quench frequency may be used to accommodate wider information bandwidth. This may be combined with filtering on the high frequency side in order to remove unwanted, transmitted signals and reduce inter and cross modulation products. The use of such filtering also improves properties when a number of transponders operate together in the same frequency band. Ringing in the high frequency resonant circuits may be reduced by quench controlled dampening of the resonant elements provided that constant dampening does not suffice. In some cases one may, in order to optimise the properties of the present invention, insert quench control at several levels, as an example by controlling varactor diodes in the resonant networks, but in such a way that the dynamic range properties are not destroyed by harmonic energy from the quench frequency. Introducing quenching at various levels, as well as several quench frequencies, is a way of improving the super regenerative properties, as opposed to corresponding functions in primitive, simple self quenched super regenerative receivers with known technology, where unpredictable spurious oscillations may improve the super regenerative function sporadically. The important task in this respect is to control the active part of the cycle (duty cycle) of the super regenerative oscillator and at the same time during one duty cycle to prevent stabile oscillations, that is to say that with no signal in there should be no repeated cycles of the same cycle length or frequency.

In the opposite case the oscillator will drastically change characteristics to become a lockable oscillator with a carrier frequency and sidebands with individual spacing equal to the quench frequency.

The super regenerative transponder of the present invention is a switched of modulated oscillator, but operates in a mode different to that of an injection locked oscillator and in the present invention specific conditions are met for its full potential to become utilised. With no in signal it transmits just noise where the noise level is mostly determined by the dynamic range and bandwidth of the super regenerative transponder. Bias and quenching are matched to make the high frequency oscillator operate in super regenerative mode. The curve function of the quenching signal may be matched to this purpose as when it proves efficient to supply revers bias in the none active part of the quench cycle to the SG oscillator. This serves to ensure that the circuit works across a wide frequency range with no "unlock" problems in the communication channel. When stabilising, locking or both of quench frequency is called for, this is done on a much lower frequency than the carrier frequency and the locking may then be performed using narrow loop bandwidth and inexpensive, simple and reliable circuits. The present invention may use injection locked quench oscillator implemented with resonants of the types RC, crystal or ceramic. Inexpensive implementations are provided using cheap clock crystals at 32 kHz in overtone circuits for quench frequencies of 32 to typically 288 kHz. For quench frequencies from 200 kHz and far into MHz ranges, low cost, ceramic resonators or crystals are available. A simple version of the present invention is where the quench oscillator is phase and frequency locked by being connected to the "output" of the super regenerative oscillator, which contains the synchronising or locking information. This connection is done through a filter that is likely to be best served by a one or multi-pole LC filter. This connection line thereby serves both quenching of the high frequency oscillator and locking of quench oscillator. However, the circuits for quenching and locking may also be designed as separate circuits at the expense of some complexity. A further embodiment of the present invention is the possibility of using the high frequency oscillator as a quench oscillator as well, wherein harmonics of the quench frequency may be reduced with a suitable oscillator circuit solution with or without using a selective, high Q resonator element for the quench frequency. For solutions where cost tolerances are larger, more advanced frequency and phase locking circuits using known technology may be applied. The super regenerative transponder in the present invention works, as mentioned, in principle as a one port amplifier with the ability of very high gains which may be used to amplify signals in both directions in a chain or in all directions in a wireless system. The problem of quench noise into the transponder is solved by shielding and filtering the quench frequency from the input or the most sensitive part of the super regenerative circuit to avoid harmonics destroying the dynamic range. This is an essential embodiment of the present invention in order to achieve large dynamic range and bandwidth with the use of the super regenerative principle. Shielding may often be replaced by making the electronic circuits small and compact in order to avoid coupling from larger areas or lines. In this way the present invention accomplishes use of quench frequencies typically 20 to more the 100 times higher than known technologies that use the super regenerative principle, mostly for radio receiver applications. The present invention may in principle be applied to communication with whichever center frequency. But in practice it will serve purposes at frequencies from a few MHz and up to the millimeter wave ranges. The bandwidth of the communication channel for a specific super regenerative transponder will among other things depend on the quench frequency and of how high a quench frequency is required by the bandwidth. In the present invention high quench frequency is realised in some cases using active amplifying components with high gains in combination with dampening of the Q factor of the resonating network of the super regenerative oscillator. The super regenerative transponder in the present invention is an oscillator but without a stable oscillation where the active element may have an input and an output and in such cases therefore if a two port. The output is made as a part of the feed back loop, but without destroying the properties of the SG oscillator. The present invention permits with modern components to accomplish very high gains (40 to 100 dB), sensitivity (typically −90 dBm) and high output level (example +20 dBm) along with wide bandwidths. Which of these properties the transponders of the present invention is to contain, is determined by choosing active components and bias. As with active circuits in general, the transponder properties and design must, based on known principles, be chosen with respect to what parameters are the most important. The dynamics is further determined by a number of transponders or super regenerative oscillators brought to work together or in parallel. None of these measures to optimise the properties of the present invention have significant negative influence on the high performance/cost ratio.

The present invention will be able to work as a two-way signal booster with or without galvanic connection, or as an amplifier with large and small signal properties that resemble those of ordinary, one-way, band limited amplifiers. The present invention will, on high frequencies like mm frequency bands, be quite easily realisable due to great advances of amplifying component frequency limits.

In a communication system as described, the transponder system of the present invention allows the level on lines or in radio systems to be kept low and in many cases exempted from authority licensing requirements by applying a sufficient number of transponders using sufficiently close spacing.

SHORT DESCRIPTION OF THE FIGURES

The present invention is described in more detail in the following with examples and references to the appended drawings, where FIG. 1 shows the block diagram of a typical transponder system corresponding to known technology comprised by an analogue and a digital unit;

DETAILED DESCRIPTION

Figure 1:
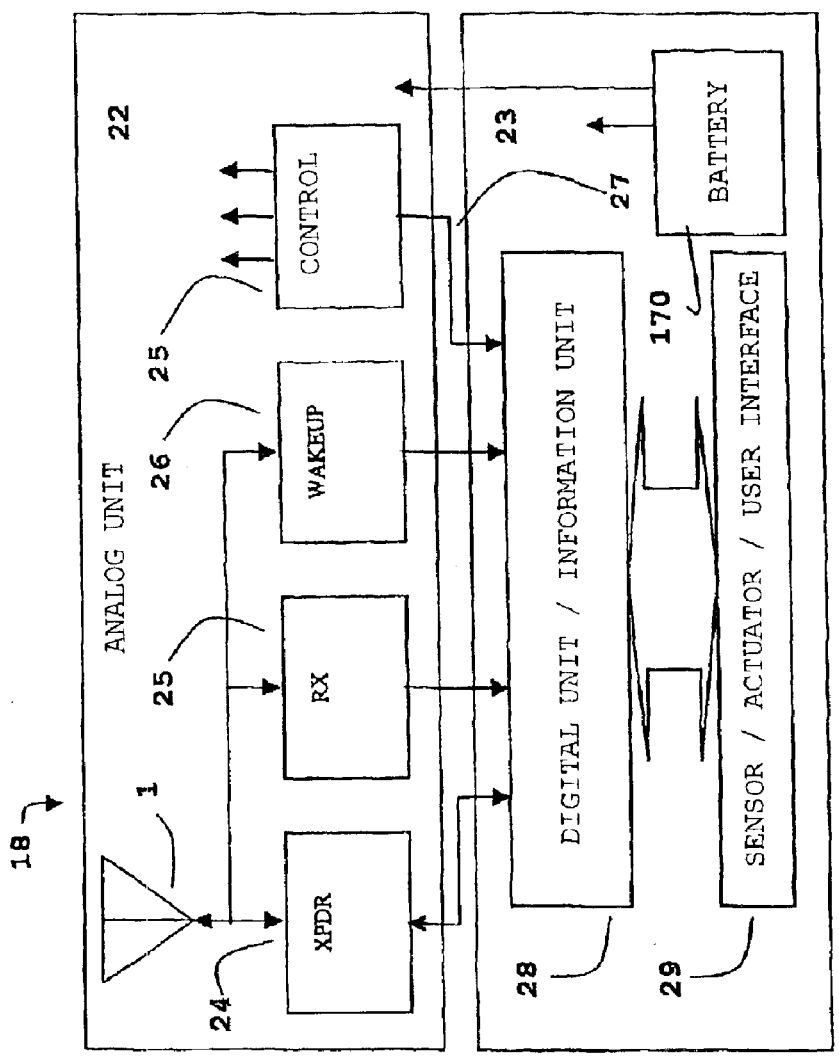

In FIG. 1 is shown a typical transponder device 18 consisting of an analogue 22 and a digital 23 unit. The analogue part has an antenna 1 and a radio frequency transponder 24. It is often designed to include a down link receiver 25 and a wake up receiver 26 as well as a control unit 25. When the digital part is included in the transponder device 18 it will consist of an information unit 28 normally combined with an interface 29. The transponder device 18 also consists of a power supply most commonly made up of a battery 170.

The most important part of the transponder device 18 is the transponder 24 for up link. The down link information receiver 25 is either a separate part of the transponder device 18 or is partly integrated with the wake up receiver 26. The digital unit 23 information device 28 identifies the transponder device 18 and the digital unit may also posses abilities of processing information as well as perform control of functions in the analogue unit 22 through a control interface 27. The digital unit 23 may also contain a physical interface 29 towards user, sensors or actuators.

Figure 2:
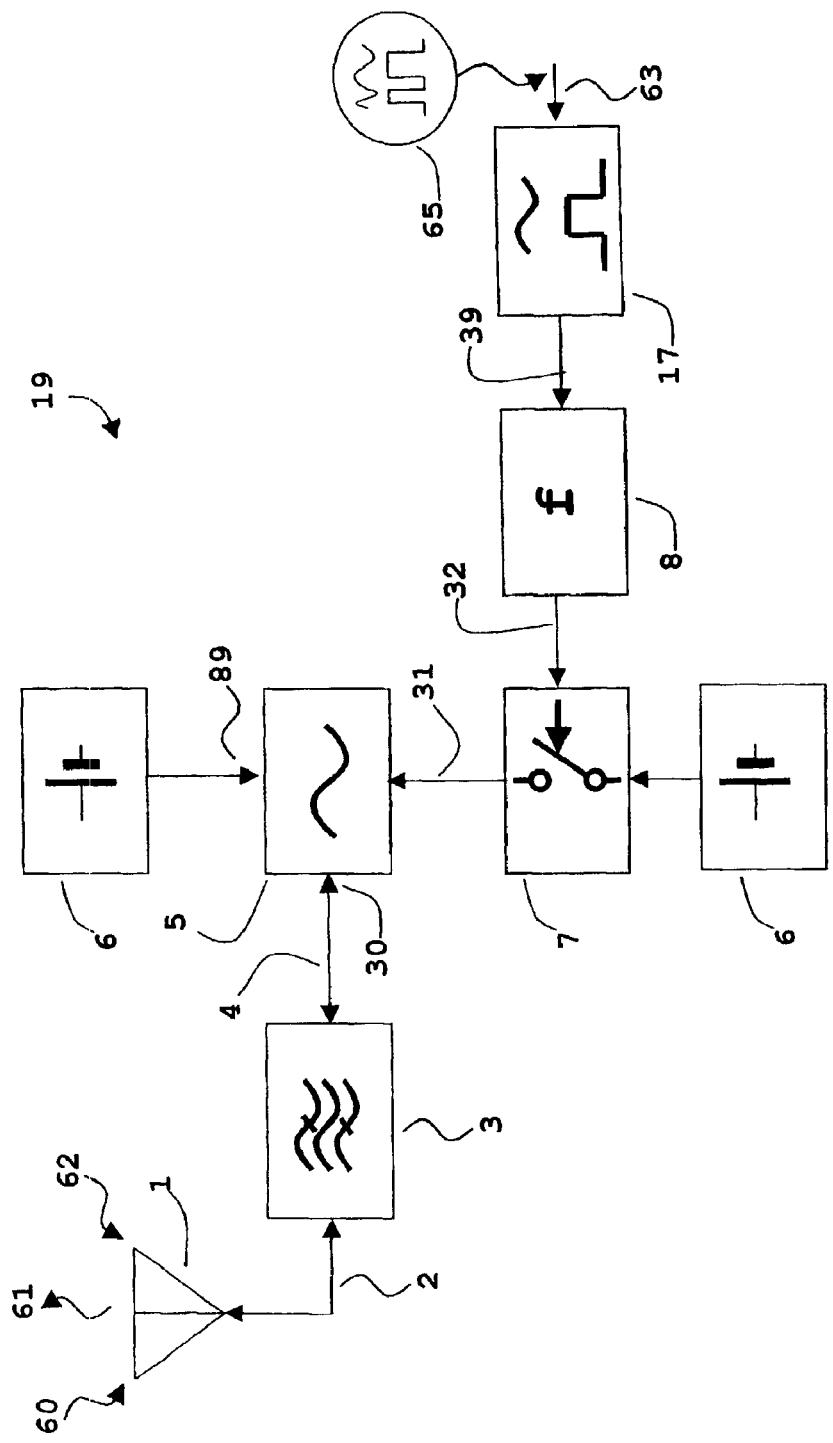
FIG. 2 shows a block diagram of an implementation of the first aspect of the present invention, where the simplest possible method of retransmission based on the present invention is shown.

In FIG. 2 a block diagram of a transponder 19 according to the present invention is shown and where a simple method for retransmission with the help of the present invention is illustrated. The solution shown for the present invention may be used both for signal repetition, interrogation and transmission. It encompasses a bi-directional coupling 2 between antenna 1 and a band pass filter 3, and a bi-directional coupling 4 leading to an oscillator 5 that contains separate parts or is integrated in a circuit which, depends on the requirements of the transponder 19. This concerns requirements of channel bandwidth, multi-channel possibilities, unwanted signal sensitivity and radiation within and outside the communications band as well as choices of antennas.

The oscillator 5 may in principle contain a random type oscillator circuit which, again is identical to an unstable amplifier, and the connection point 30 involves in principle any point in the oscillator where the necessary coupling of energy in and out of the oscillator is achieved while maintaining the minimum Q in the tank of oscillator 5. This gives a super regenerative amplification which is sufficient for the purpose of which the transponder is intended. A bias circuit 6 supplies bias to oscillator 5 that may contain a bipolar or field effect transistor in transponders from the short wave ranges and all the way up to the cm and mm wave ranges (microwave). Oscillator 5 will, as a rule, only consist of one transistor, but may in principle consist of more, like when special resonating elements is to be used as resonating element (tank circuit) or it may contain an integrated circuit, i.e. a MMIC (microwave integrated circuit). The resonating element may consist of inductance and capacitance in the form of coil and capacitor, or may exist in the form of band filter, or in the form of lines, or in the form of ceramic or dielectric resonating elements. Dielectric resonator is only applicable for narrow frequency bands, but gives good suppression of unwanted in and out signals outside the communication channel. As resonating element, a dielectric antenna may be used as well. For some multi-channel applications or for very large bandwidths, resonators with lower Q values must be used, like inductor and capacitance. The transponder 19 may then experience unwanted in and out signals outside the communication channel or band. An electronic switch 7 that may be comprised by a diode or transistor has two main positions. One gives the oscillator 5 oscillation conditions while the other quenches the oscillating state. The use of such a switch in connection with an oscillator is called "quenching". The working principle of the transponder is that the switch 7 never permits the oscillator 5 to oscillate continuously. This is accomplished letting the switch 7 alter or alternate bias to oscillator 5, or by having switch 7 alter or alternate an impedance which is seen by oscillator 5 (meaning that the impedance is capacitively, inductively or resistively connected to the high frequency energy. At the same time, the oscillator 5 will produce a negative resistance at the connection point 30 and thereby produce high amplification for the foreign frequency components present at connection point 30.

In the following we will accept that the in signal is a carrier with no modulation. Since the signal path from the connection point 30 to the antenna 1 is bi-directional it means that the signal entering the antenna 1 (i.e. an unmodulated carrier frequency 60), will be retransmitted 61 through the antenna, but amplified. The retransmitted signal will also be in exact in-phase with the received signal. If the controlling signal 32 which controls the switch 7 is of a sufficiently high frequency in relation to the bandwidth of the filter 3 or of the resonator in the oscillator 5, the only signal retransmitted on antenna 1 will be the received signal that arrived on antenna 1, but amplified. If the mentioned bandwidth is wider than the frequency that controls the switch 7, the retransmitted signal on antenna 1 will contain two side bands (sub carriers) spaced from the received signal corresponding to the frequency that controls the switch 7. If the control signal 32 that controls the switch 7 that in turn controls oscillator 5 is an alternating current signal with superimposed information, the signal retransmitted through the antenna 1 will include two side bands containing this information.

The signal that controls the switch 7 comes from a modulator 17. The signal from the modulator may contain information that is to be transmitted (up link) over the transponder. The modulator 17 is a self-contained module or is an integrated part that may consist of a processor. The control signal 32 may be filtered through the filter block 8 which, may prove necessary in order to reduce harmonics of the fundamental frequency of the modulator signal 39, that may be an externally supplied information signal 63 for retransmission.

Figure 3:
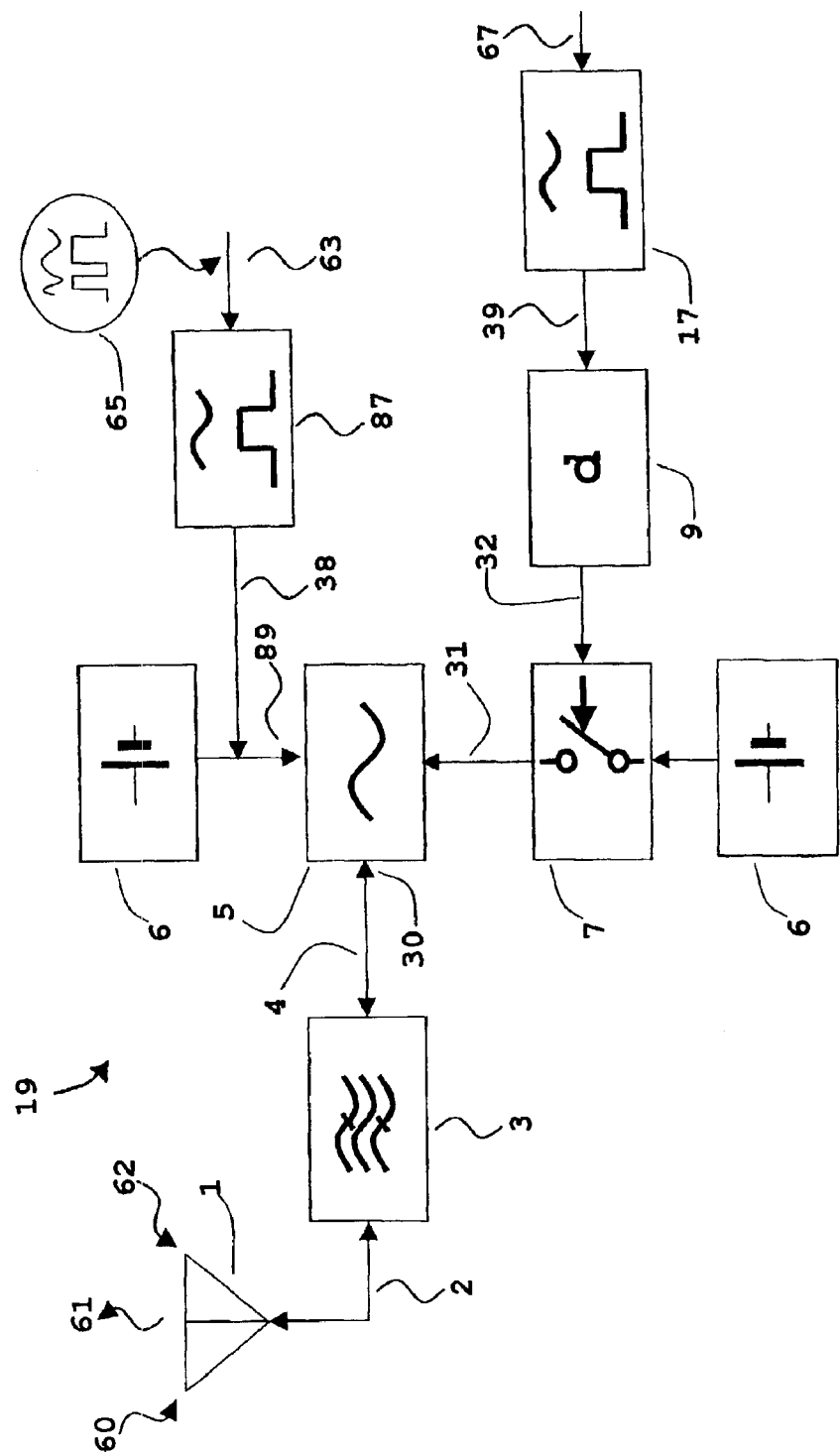
FIG. 3 shows a block diagram of an implementation where a separate oscillator signal is introduced in order to improve control with bandwidth, unwanted radiation and energy consumption of the transponder.

In FIG. 3 a block diagram is shown with a second example of the present invention, with a transponder 19 that may be used both for signal repetition, interrogation and transmission, where separate modulators 87, 17 are introduced for modulation of information 65 respectively switching 31, to improve control with the transponder 19 bandwidth, unwanted radiation and current consumption. A signal 39 or 67 may b a signal from a separate oscillator or from a processor or a similar arrangement that is able to generate a high frequency signal, or it may in less critical applications be generated as a self oscillation in the oscillator 5 (self quenching). Separate modulators for information and switching makes it possible to use a pulse forming network 9 together with the frequency of the signal 39 and the function of the modulator 17 can control various properties of the transponder 19. The information signal 38 must in the transponder 19 modulate the oscillator 5 and this may take place in different ways, here shown by modulating the bias 89. This modulation frequency is likely to be half or less of the primary quench frequency 32. The signal 38 becomes the source of two side bands (sub carriers) that is positioned closer to the carrier than the sub carriers brought about by the signal 32. The quenched, locked oscillator may in this way produce good performance as a mixer/modulator, that is to say retransmission of data from transponder, primarily in a homodyne system. By giving the primary quench much higher frequency than secondary (modulation) quench, primary side bands widely spaced from (radiation in and out) carrier will be mostly attenuated by a band pass filter in the input/output. The network 9 may alter the properties of the transponder 19 by modifying the symmetry of the signal 39. It will sometimes be desired to lower the current draw and reduce radiation outside the communication channel. An important property of the transponder 19 of the present invention is the possibility of using a switching frequency 39 that is much higher than the highest information frequency 38, typically 10 to 100 times higher. That will ensure that the transponder 19 has wide bandwidth, meaning multi-channel possibility, tolerance against temperature drift and other frequency drifting, and ensure that unwanted signals generated in the oscillator 5 will fall outside the bandwidth of the resonator in oscillator 5 or in band filter 3 or in antenna 1.

Figure 4:
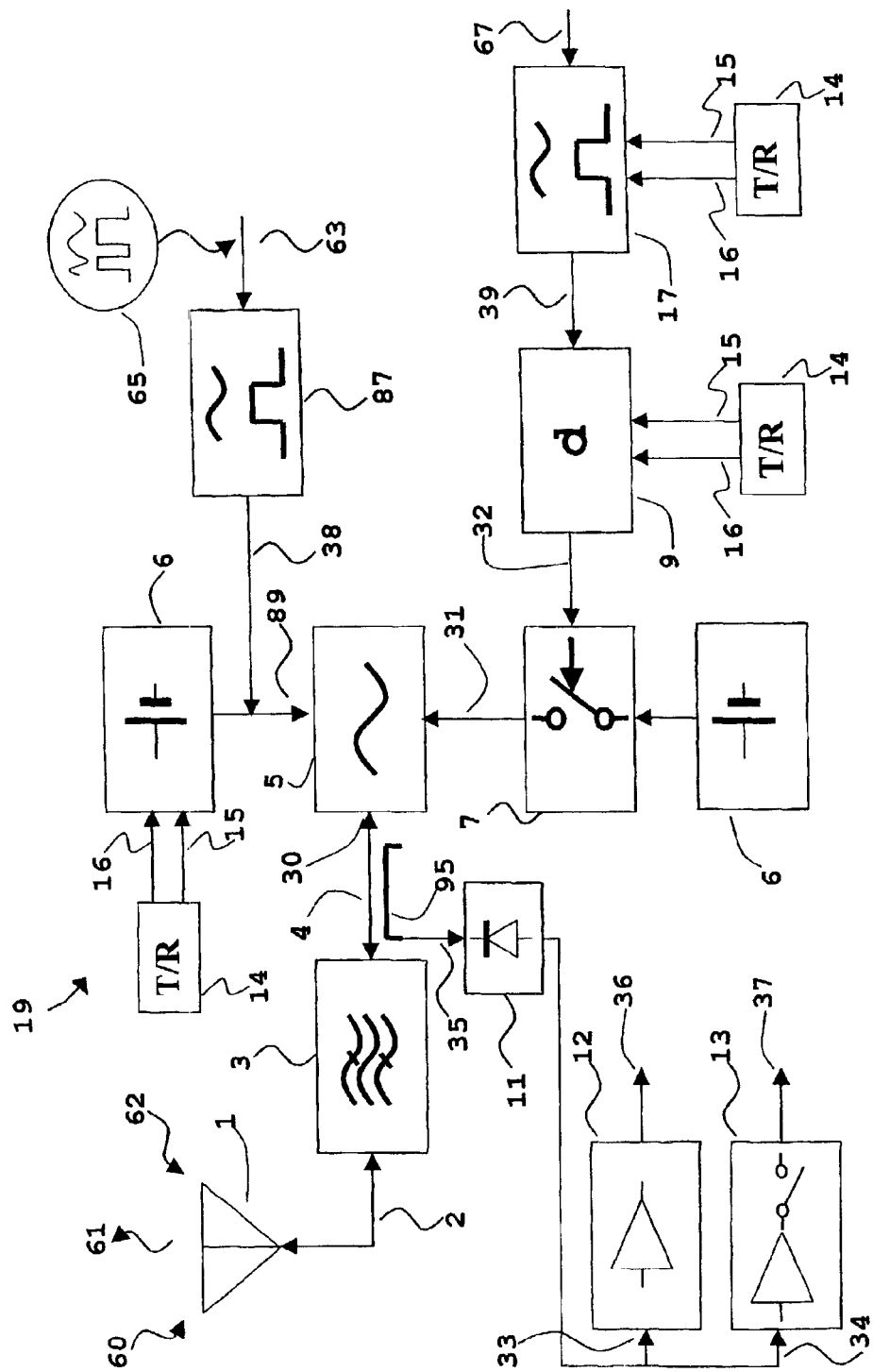
FIG. 4 shows a block diagram of another design version where a detector and amplification for reception (down link) is arranged and where various levels of reception may be controlled by an introduced TR switch.

FIG. 4 shows a block diagram with the third design version of the transponder according to the present invention, where a detector 11 is introduced as well as an amplifier 12 for receiving (down link), where the transponder still can be used both for signal repetition, interrogation, transmission and reception. This design version includes also a frequency or level discriminating amplifier 13 for wake up and the design version also includes a T/R (transmit/receive) switch.

Various levels in oscillator 5 for transmission, reception and wake up may be controlled by the TR switch 14 to control the gain in oscillator 5 and the current draw of the transponder. This is done by altering the bias conditions for oscillator 5, possibly the oscillator characteristic for the control signal 39, possibly the pulse forming network 9 like altering the symmetry of the control signal 32. The purpose here is to achieve optimal conditions for the three mentioned modes in the transponder 19. The parameters that are to be controlled in this way are retransmission, unwanted radiation in and out, receiver sensitivity and current draw for the three mentioned modes and to ensure that the present invention can work with a battery life that corresponds to the shelf life of the battery.

The working principle of reception of information (down link) is that a signal 35 that is connected relatively loosely to the signal path 4, is led by the help of a coupler 95 to a detector 11 (i.e. a Schottky diode) that demodulates the modulated signal received on the antenna 1 and is amplified by the oscillator 5. The coupler 95 may also be introduced at other points in the oscillator circuit 6 but normally the optimum point will be at the signal path 4. The detected signal 33 will have relatively large amplitude but must still be amplified in an amplifier 12 before it can be utilised in an information unit like a processor. The amplifier 12 may be realised as a micro power amplifier using known technology.

The signal 34 must be amplified, possibly filtered as well and passed through a hysterisis circuit in the circuit 12 before a logical level 37 is accomplished to wake up an information unit.

Figure 5:
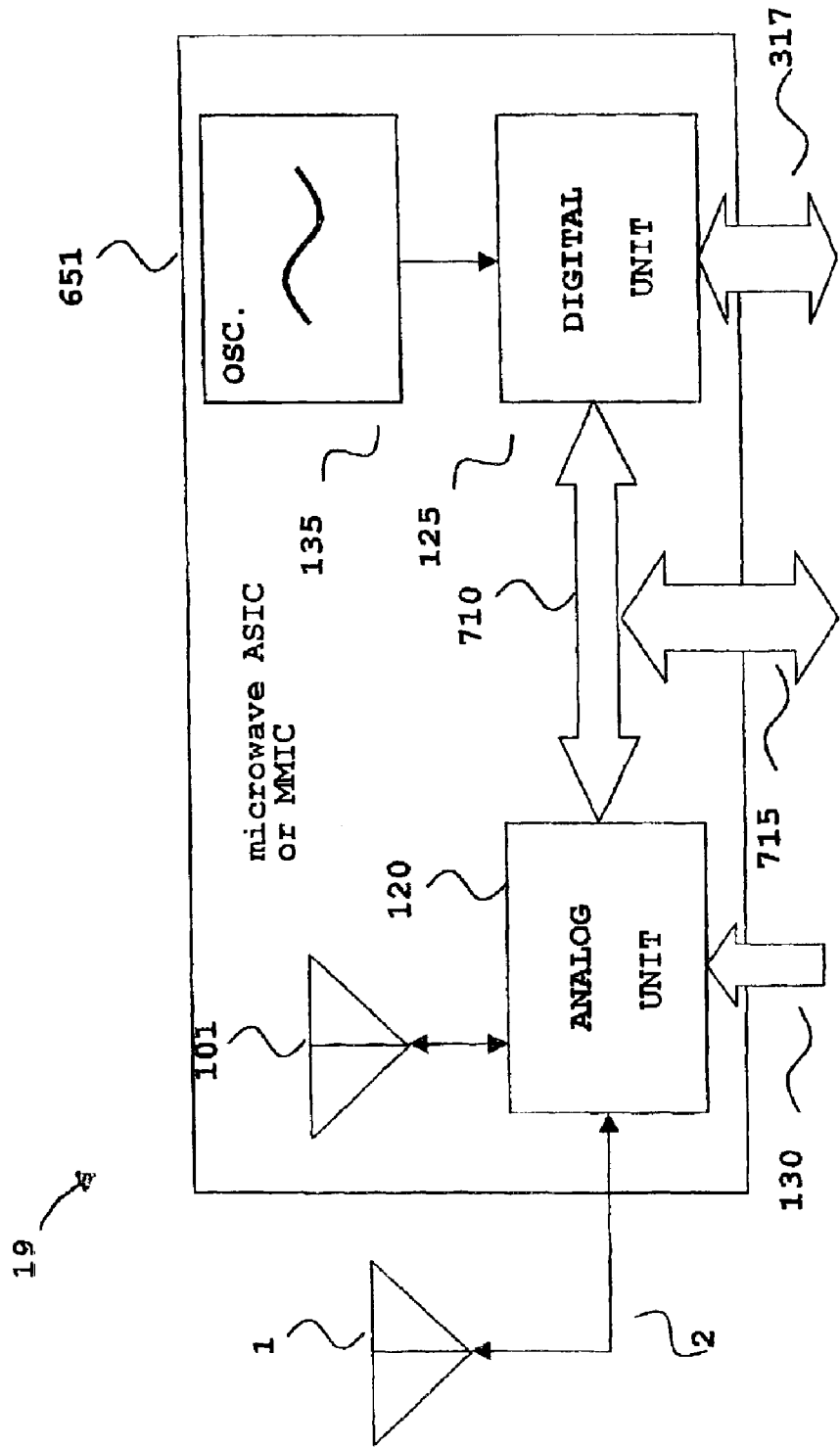
FIG. 5 shows a block diagram of still another design version, where the transponder is introduced in a microwave ASIC due to the simplicity of the microwave technical concept which the present invention is based upon which again permits simple and low cost realisation in microwave ASIC or a MMIC.

FIG. 5 shows a block diagram of a fourth design version of the transponder according to the present invention, here shown as an "analogue unit" 120 where it is introduced in a microwave ASIC (customer specified integrated circuit) 651 or MMIC (microwave integrated circuit). The implementation is comprised by either the radio frequency transponder 120 only or it contains a digital unit 125 as well, a clock oscillator 135 and input and output terminals.

The design version is either a part of an ASIC or MMIC 651, has only two terminals, acts as a negative resistance amplifier where bias and modulation is fed across the terminals, or it includes an ASIC or MMIC 651 with three or more terminals for a desired number of signals, bias supplies and control signals. Because the present invention is based on a simple, microwave technical concept, it allows a simple and cost effective realisation of microwave ASIC 651 in addition to being simple enough to become realised in a MMIC 651. The antenna 1 may be external and connected to ASIC or MMIC 651 through the signal path 2 or the antenna 101 may be integrated in ASIC 651 when it is made for high microwave frequencies in order to ensure an efficient electrical length within ASIC or MMIC 651.

Signal and control lines 710 may be connected to pins 715 on ASIC 651 or be directly connected to a control unit 125 which, may be an information unit as well.

Figure 6:
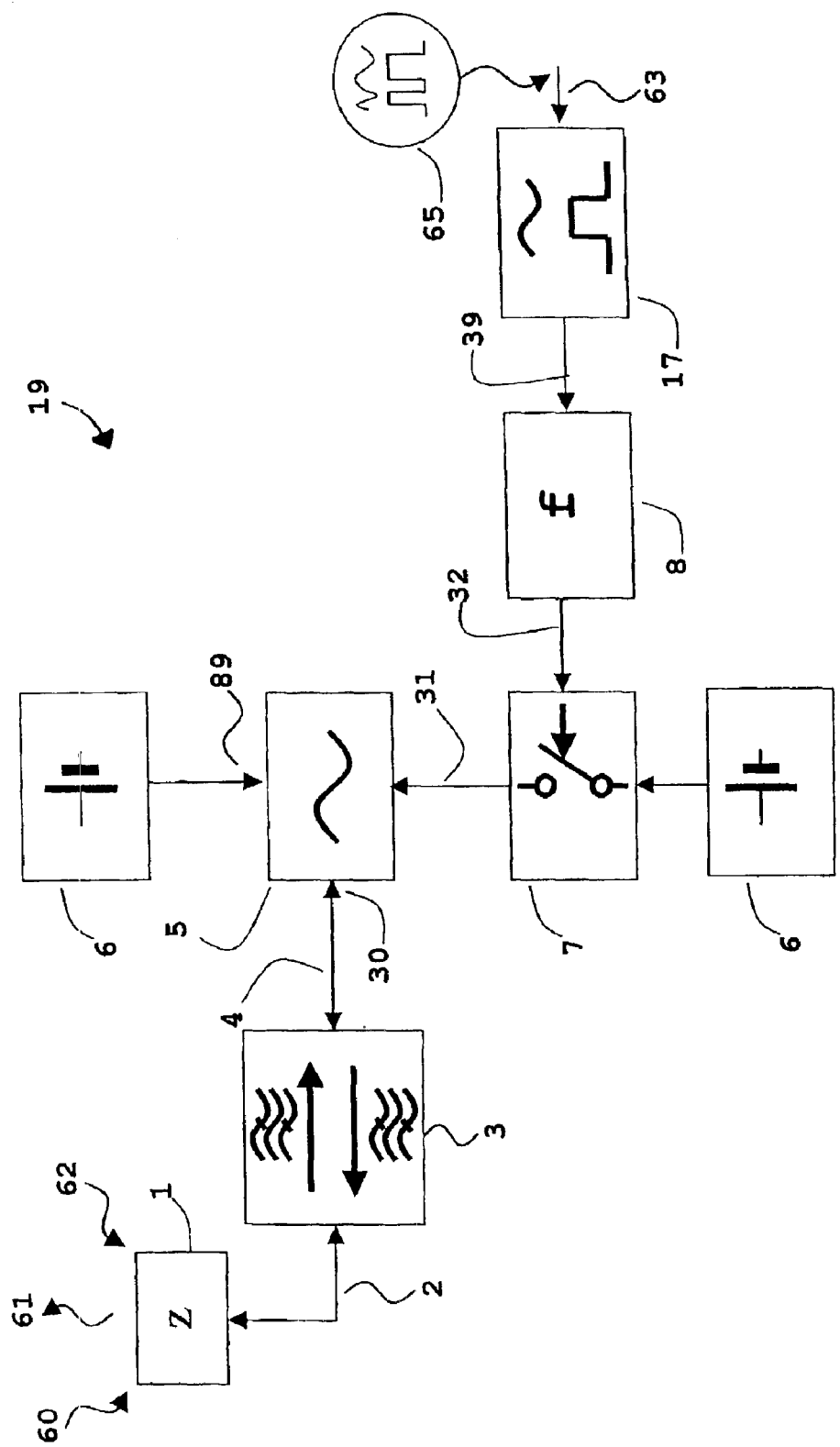
FIG. 6 shows a block diagram of an implementation that diverts from the design version in FIG. 2 in that an antenna is replaced by a different coupling element as well as a filter in the signal path to and from the oscillator is shown as a split, bi-directional filter.

FIG. 6 shows an implementation that is fairly similar to the example shown in FIG. 2, but it is shown that the antenna 1 is generalised as a coupling element of a more general type. Moreover is shown a special type filter 3, namely with possibilities for differing filter characteristics of the two signal paths to achieve a frequency shifted retransmitted signal.

To ensure that the transponder oscillator operates in stabile super regenerative mode and at the same time maintaining necessary bandwidth and dynamic range one may provide control of the super regenerative duty cycle (active part of cycle) as well as oscillations superimposed on the quench frequency. In some cases, i.e. for higher power levels, fixed or controlled dampening of Q factor may be used for the same purpose. One way of realising this is to arrange a filter to reduce overtones (harmonics) of the quench frequency within the frequency range where the sensitivity of the transponder is highest. The filter should be arranged either as part of the oscillator itself or as part of a separate circuit connected to the oscillator. The filter implies that the super regenerative duty cycle is increased which, implies an increase of the transponder dynamic range and bandwidth and at the same time reducing interference from the quench signal in the output signal by using the highest possible quench frequency.

The same advantages may be accomplished by introducing secondary quenching as oscillations superimposed on the primary quench signal itself. Secondary quench is introduced at any point that affects the oscillation conditions of the oscillator.

A further possibility that offers the same advantageous function is to use quenching from any type of function generator within or separate of the transponder that is able to control the quenching asymmetrically.

Lastly, the same type of favourable function is accomplished by two or more super regenerative oscillators or transponders connected together. This requires that the transponders have common quenching or is at least synchronised with controlled phase shifts between the different quench signals. This allows in principle one hundred percent duty cycle for the transponder.

Figure 7:
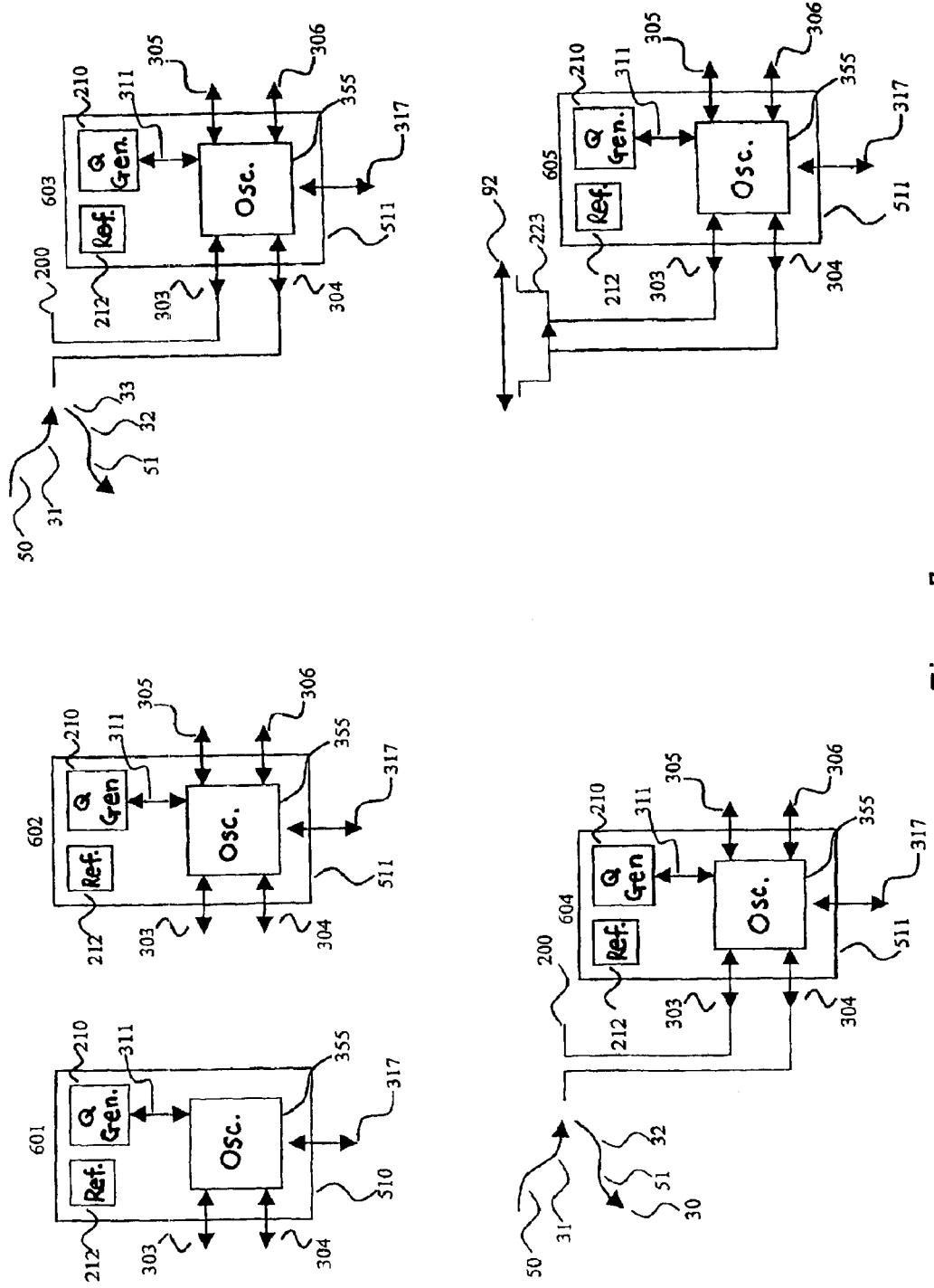
FIG. 7 shows a block diagram illustrating the second aspect of the invention where a super regenerative transponder works as part of a network architecture.

FIG. 7 shows a block diagram in connections with the second aspect of the present invention where the super regenerative transponder 510 is used as repeater, amplifier or booster, separately or as part of a network architecture or as an addition to a network architecture. The transponder may be present in different versions depending on what type of network or infrastructure it is being part of. The transponder 510 may be intelligent and may receive or transmit information through an interface circuit 317 like PC, sensor or actuator. To enable a number of transponders to work together without interference, the quench signal 311 is stabilised with internal or external synchronisation. Internal synchronising of the quench generator 210 may, if needed be achieved with an internal, very stable reference 212. The quench generator 210 consists of a function generator and filtering. External synchronising of the frequency source is achieved by synchronising to an external synchronising signal 31 or by synchronising to the implicit quench signal 32 of a corresponding transponder 511 in the network.

Synchronising of the quench frequency includes the possibility of synchronising demodulation with the duty cycle of the signals from a super regenerative transponder. This may be desired or required for some applications, like when the information bandwidth is large compared to the quenching frequency. In other cases band pass filtering in the transponder or receiver/demodulator receiving from the transponder(s) may take care of this problem.

The quench signal or switching signal 311 may be applied to the oscillator 355 in such a way that it also contributes to reduction of harmonics from the quench signal 311 on the input 303, 304 of the oscillator 355. The injection 311 may as well be in connection with bias on a defined output 305, 306 of the oscillator 355 to reduce the interference effect of injection 311 on input 303, 304. The quench line 311 may combine quenching and synchronising of the quench generator 210 with the help of a received signal from th erator 355. Th combined input and output 303, 304 is connected to a circuit 200 for receiving and transmission 51 of received high frequency signals 50 that may be modulated or not modulated by th transponder 510. In ord r to att nuate signals in unwanted direction, a direction sensitive connecting device 223 is used. Th transponders in FIG. 7 may be intelligent, for example by incorporating a processor as mentioned in the description of the first aspect of the present invention, enabling them to transmit their own information signals 33, and they may contain receiver devices with known technology independently of or together with the super regenerative oscillator, for example as mentioned earlier. Such a receiver device may utilise the large gain available from the super regenerative oscillator. FIG. 7 also shows how amplification of signals in one direction on a line 92 can be attenuated using a directional coupler 223 which, may make use of a combination of capacitances and inductances, transmission line solutions (microstrip, stripline, lines without substrate) or circulators.

Figure 8:
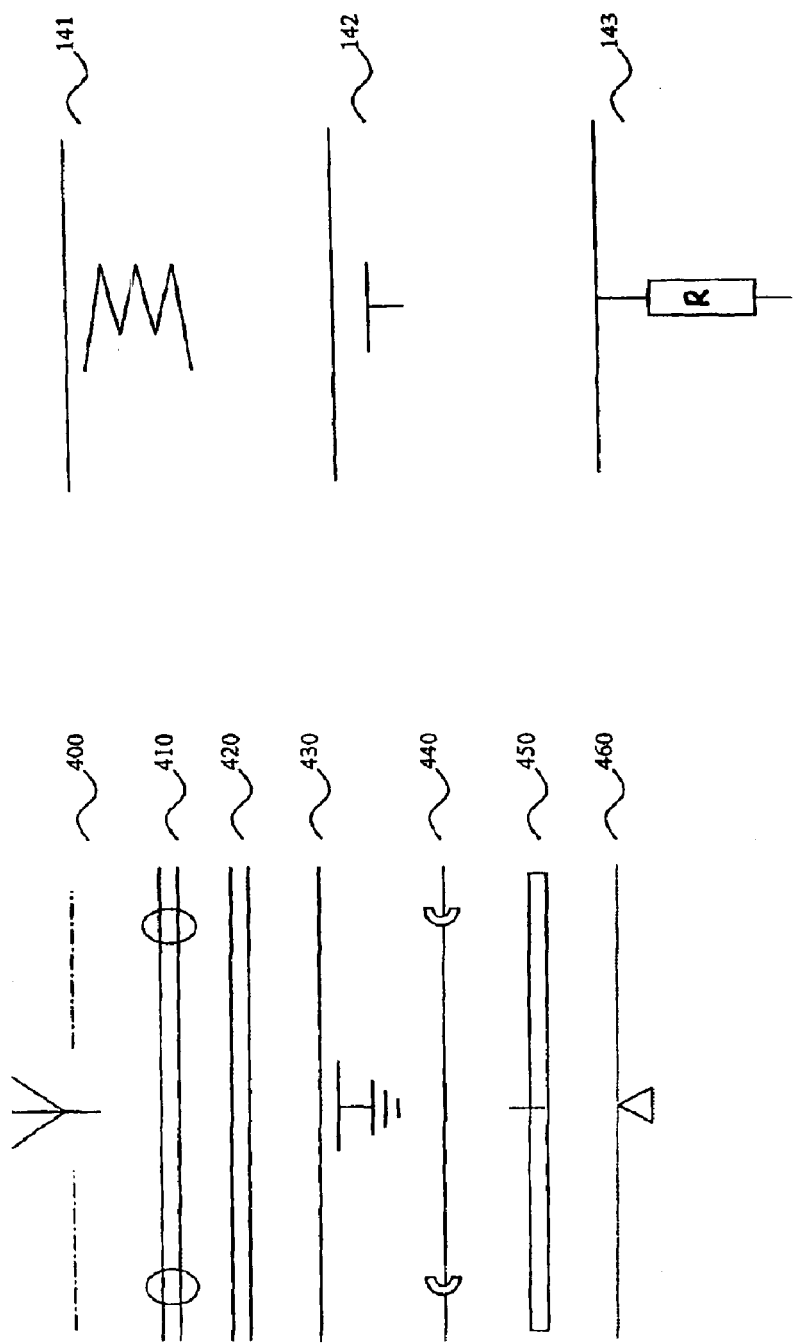
FIG. 8 illustrates the various signal transmission media that a transponder in a network may be connected to, FIG. 9 shows a special design version of a transponder according to the present invention aimed at co-operating with a network.

FIG. 8 shows, in accordance with FIG. 7, the various media that the transponders/transponder system according to the present invention can be used together with, including:

- free space propagation 400 in vacuum, gas, liquids or solid material with the help of antennas or probes,
- transmission line 410 consisting of a multi-lead electrical cable or cable like infrastructure,
- transmission line 420 consisting of an open, electric line or an arrangement corresponding to an open electric line, transmission line or a line system comprising a wandering wave antenna line system 430 consisting of on or more wires and where the transmission is referenced to earth,
- transmission line 440 performing as a wave guide with open surface, a so called Lecher Wire where, the wave when, having a short wavelength, is kept trapped near the wire and experiencing low attenuation,
- transmission line 450 which, is a closed waveguide, and
- transmission line 460 being an optical waveguide.

Connections to line may be realised as loose couplings with the help of inductive arrangements 141, capacitive arrangement 142, resistive arrangement 143 or, a combination of the three as with transmission lines in the form of microstrip. The coupling arrangements of the types 141, 142 and 143 may in some cases be used alone or in combination to power the transponders from the hosting infrastructure.

Figure 9:
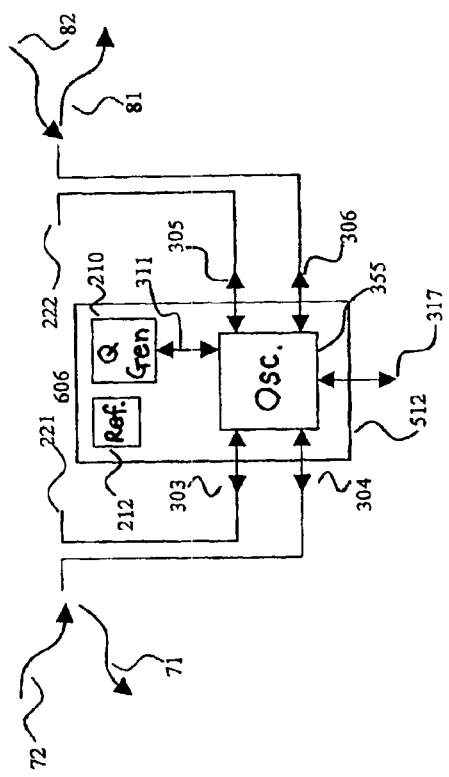

FIG. 9 shows a transponder 512 in accordance with FIGS. 7 and 8, where an output 305, 306 is defined in the oscillator 355 making the port 303, 304 an input or both input and output, while the port 305, 306 is an output with a higher level and input with lower sensitivity. To the ports 303, 304 and 305, 306 have arrangements 221, 222 connected for receiving and transmission of signals for retransmission 71, 81 of information and or reception 72, 82 and transmission 71, 81 of information and possibly reception 72, 82 of synchronising/locking 72, 82 and possible transmission of synchronising/locking 71, 81. The coupling arrangements 221, 222 may have directional sensitivity in order to for example achieve a necessary attenuation of echo when it is required.

Figure 10:
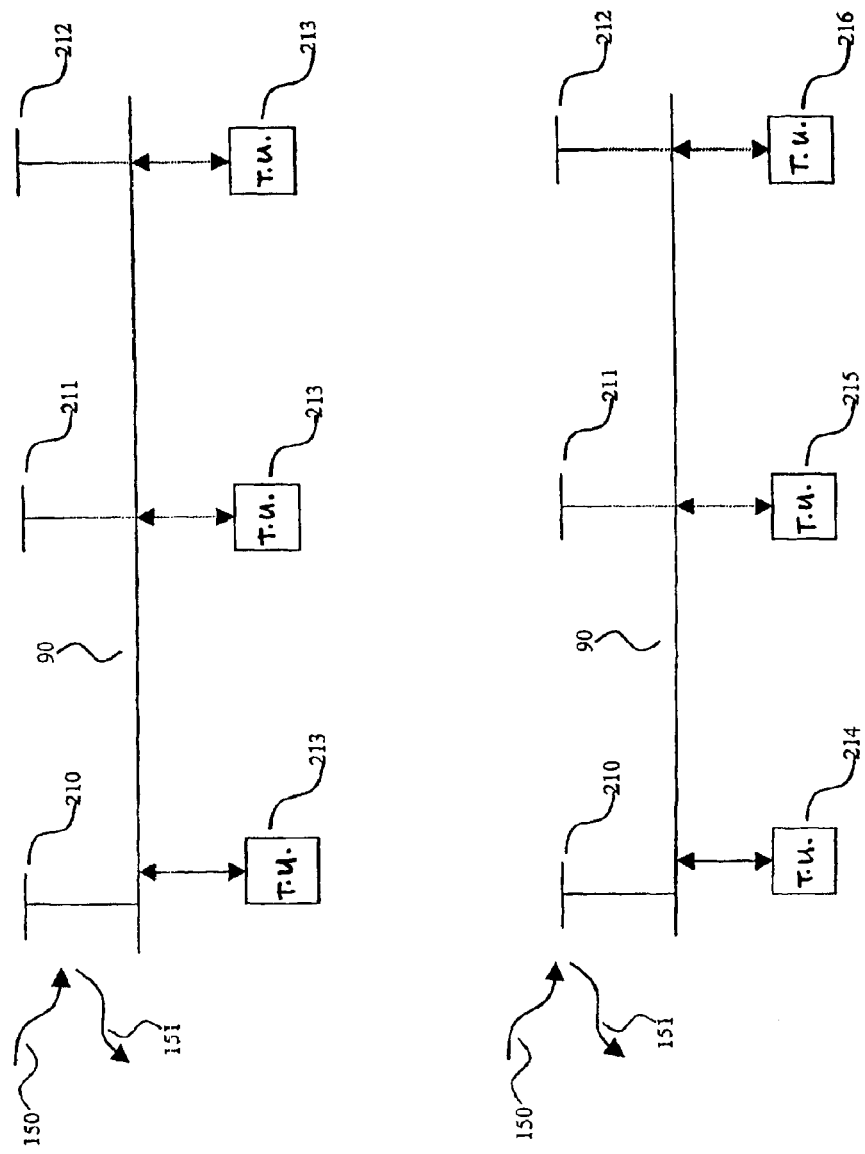
FIG. 10 shows an application of a number of transponders together in various ways in connection with network solutions.

FIG. 10 shows how a number of transponder units 213 in accordance with FIGS. 7 and 9, in order to improve dynamic characteristics of signals in one or more directions 150, 151, may be connected together in a coupling arrangement 210 with the help of a common coupling 90 or with the help of separate coupling arrangements 210, 211, 212 and correspondingly shows how a number of transponders 214, 215, 216 are arranged to increase bandwidth and dynamics and may be connected together to a coupling arrangement 210 with the help of a common coupling 90 or with the help of separate coupling arrangements 210, 211, 212 and where the transponders 214, 215, 216 have differing specifications.

Figure 11:
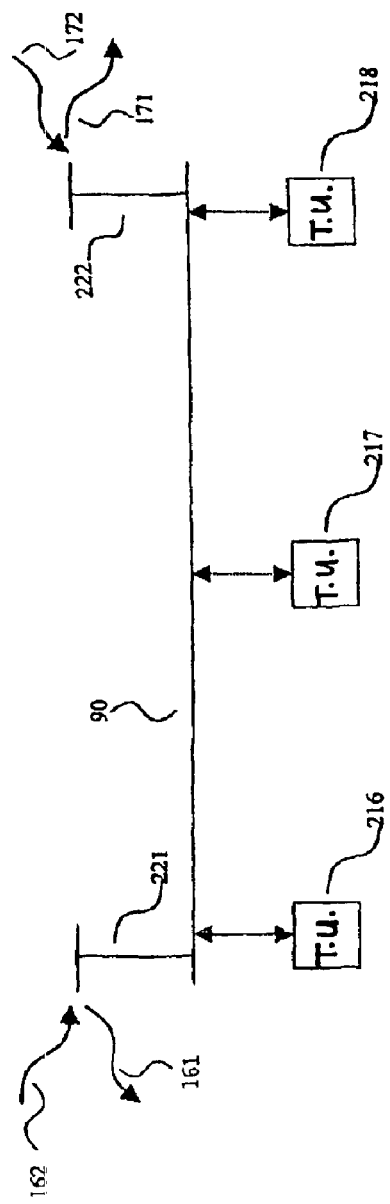
FIG. 11 shows an application of a number of transponders together in still another embodiment.

FIG. 11 shows, in accordance with FIGS. 7 and 10, how a number of transponder units 216, 217, 218 may be connected together with the help of a common coupling or transmission line 90 allowing the coupling arrangements 210, 222 to transmit signals 161, 162 between a physical position 221 and signals 171, 172 on a different physical location 222, for example from one room 221 to another room.

Figure 12:
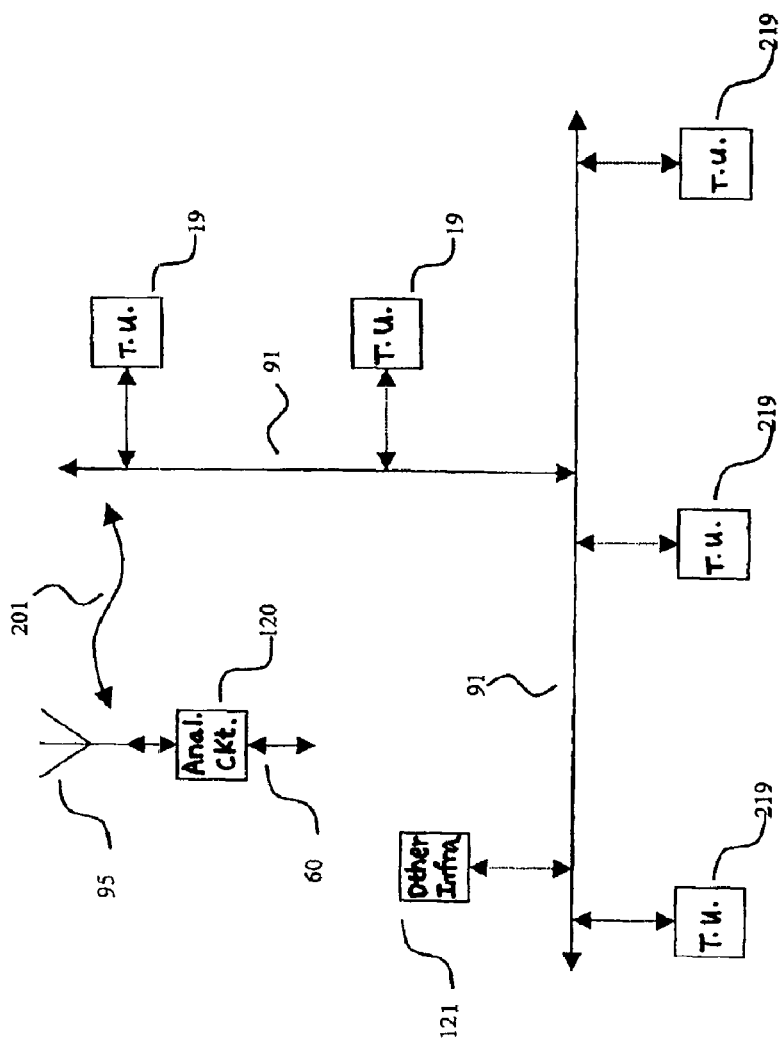
FIG. 12 shows an example of distribution of transponders along transmission lines or waveguides to increase capacity of the line.

FIG. 12 shows one example of how transponders 219 in accordance with FIG. 7 to 11 can be distributed along transmission lines or waveguides 91 making these lines suitable for functioning as transmission medium for substantially higher bandwidths and greater distances than would otherwise be possible. This structure will additionally make the transponders 219 capable to work as intelligent and unintelligent nodes in the derived network consisting of the lines 91 and the transponders 219 where other communications infrastructure 121 may be connected to the medium 91 and where communication with transponder 219 may be done on radio waves with the help of a radio unit 129 with antenna 95 and an interface to the outside world 60 for one way or two way communication or interrogation purposes.

The super regenerative oscillator in the present invention works in a way so that without signal, during one quench cycle, it does not reach full oscillation conditions.

It therefore has no CW self oscillations, but may have diffuse (broad band) oscillations that necessarily do not reduce the SG amplifications. The part of the quench cycle where the amplifications is achieved should be made as close to 50 per cent of the quench cycle as possible. The duty cycle of the present invention may be increased beyond this with the help of the quench signal function form or with other arrangements. This, in conjunction with no CW self oscillations giving ringing or compression, makes the SG oscillator as "transponder" in the invention showing superior gain properties. It may be made to give negligible or no interference problems with CW self oscillations. Depending on the way the SG oscillation is accomplished in the present invention, the frequency spectrum of the SG oscillator may be symmetrical or asymmetrical and may have significant or not lobes. Depending on the properties that are most essential to achieve, the present invention usually will get the best transponder properties when the frequency spectrum consists of white noise with a symmetrical curve resembling a Gausian distribution. For example, this is accomplished using a bandpass filter. The transfer function of the SG oscillator/amplifier in the present invention is independent of frequency or phase locking of high frequency CW carrier and makes large information bandwidths possible.

When the SG oscillator is used in the present invention as a transponder it works both as a very efficient mixer/modulator and as an amplifier (repeater). The mixer properties can be utilised where the transponder is to be modulated with information from the transponder or from an interface connected to the transponder. This will see applications both in radio systems and in wire based systems. The signal repeating properties of the present invention may be utilised.

Parts of the arrangements of the present invention are useful together with quenched oscillators generally and for locked oscillators. This applies to system solutions and detail solutions like band pass filtering, quenching principles, use of more than one side band system, directional sensitivity and so on.

With known technology it is possible to make transponders that frequency transpose or frequency shift the signals to avoid implementation problems with directional attenuation. Solid state technologies are making such a big progress that there are foreseeable possibilities of making sufficiently low cost and low power transponders in ASIC technology incorporating parts of the present invention.

The present invention lends itself easily to low cost, low current and efficient transponder in positioning systems for short and middle ranges where it is advisable to avoid computing phase (clock regeneration) for a transmitted signal. This is valid for distance measuring as well. It applies both to devices to be positioned and to the infrastructure of the positioning system, for example in order to improve geometry or to realise remote controlled base lines or similar in the system. The present invention is also well suited as inexpensive transponders to be carried by persons and objects that have to be positioned or found.

Positioning systems work according to one of two main principles, either by measuring time (phase) or Doppler shift. There is a third principle as well which, uses horning with the help of properties of antennas. Time measuring stations have either a single antenna (one dimensional positioning—radar and distance measuring) or two or more antennas with a given geometrical relationship (base line, aperture—two–three dimensional positioning). Doppler measuring stations measure either with the help of the velocity of the object or with the help of a synthetically produced movement of antennas at the measuring station. The object to be positioned may in some cases be measured with the help of a passive reflector. By using a transponder in the object to be positioned, maximum range and measuring capabilities are improved and it is conceivable to attain known, calibrated frequency and phase relationship for the signal which, is being transmitted from the object. This both simplifies and improves systems for both time and Doppler shift measurement compared to where the object only has a transmitter (beacon). As opposed to a solution using beacon, unknown phase variable is avoided and measurements in both signal directions are possible. This results in improved or higher update rates, precision and computation of ambiguity in time or phase measurements. The transponder 19, 219 is a novel and cost effective way of realising this with the help of its gain properties and transmission as modulator/mixer. The invention permits the positioning interrogator to be realised as a homodyne system. This is advantageous with respect to phase coherence.

Additionally, there are two main areas where the present invention introduces uniquely novel opportunities of solving positioning problems. One is the improvement and/or facilitation of geometry for measuring stations, especially mobile or moveable ones. Another is local coverage for an area being in the shadow of a positioning system. By transmitting signals to transponders that are placed in an optimum geometry in order to achieve coverage and accuracy one can, with the help of the present invention with transponders 19, 219 enable objects, that are to be positioned, perceive the transponders as being the base line system system or aperture. The system must calibrate with respect to the different time delays and geographical positions of the fixed geometry.

Any positioning system can be inverted. An inverted system may mean for example that measuring and computing take place at the object which, is to be positioned. Here, the present invention is at least of equal interest. The present invention can for example facilitate geometrical base lines provided as "sleeping" in the form of transponders 19, 219 according to the present invention in current areas for positioning services. The positioning object may then activate the transponders 19, 219 realised according to the present invention, transmit a measuring signal to them and with the help of for example phase measurements on a self contained or assisted basis compute its own position, one, two or three dimensionally.

A corresponding application of transponders 19, 219 according to the present invention is when an area which, resides in shadow of a positioning system, for example as with satellite navigation with GPS (Global Positioning System), is covered with transponders that simultaneously can see satellites in orbit and the object to be positioned. Corresponding to DGPS, a calibration station may transmit data to the positioning object GPS receiver to obtain corrections for the anomalous geometry. It thereby becomes possible to use standard GPS receivers that compute the position using PRN code or use the GPS signal phase as well. The receiver must have possibility for external calibration or may have dedicated software and lookup tables. Transponders according to the present invention are suited for this application due to the application of spread spectrum in GPS.

The present invention facilitates a supposedly novel opportunity involving both communications and positioning. It concerns electronic defence (ECM Electronic Counter Measures). Due to the high performance of the transponders it is possible to scatter transponders 19, 219 according to the present invention that make "copies" of radio and radar signals and complicates the enemy task of positioning the original signals.

The present invention using SG oscillator is well adapted as amplifier for modem modulation forms and transfer protocols since they mainly were designed to coexist with other signals and noise. They are readily using spread spectrum and spread the information energy across the frequency or time domain. The phase response of the present invention using SG oscillator shows a linear phase response across a wide frequency range.

Forms of PSK are also used in spread spectrum communication as with DSSS and FHSS and the present invention lends itself conveniently to that as well. For multi-tone, multi-carrier modulation forms as with OFDM, the present invention is also well suited provided considerations are taken of special requirements of dynamic range as with OFDM.

Synchronizing of the quench frequency involves the feasibility of synchronising the demodulation with duty cycle of the signals from a super regenerative transponder. For some purposes this will prove required or desired, e.g. when the information bandwidth is large compared to the quench frequency. In other cases band pass filtering in the transponder or in receiver/demodulator receiving the signal from the transponder(s) will meet the requirements.

Control of the super regenerative duty cycle and oscillations superimposed on the quench frequency are measures that can ensure that the oscillator operates in stabile, super regenerative mode while the bandwidth and dynamics requirements are met.

Large bandwidth factors of the present invention may be implemented using parallel coupling of a number of super regenerative oscillators with overlapping or adjacent frequency ranges.

What is claimed is:

1. An analogue repeater and transponder system for any of wireless, wire and waveguide infrastructure based digital networks for at least one transmission medium, comprising:
   at least one of at least one repeater and at least one transponder and
      where each repeater/transponder has at least one port for connection via signal coupler arrangements to the transmission medium for signal reception and transmission,
      where each of the repeaters and transponders is of analogue type with positive and large signal gain applicable to wide bandwidth uses and implemented using any of solid state components and solid state integrated circuitry, and
      where selectivity requirements are adapted to any of information bandwidth and quench frequency or ideal interference isolation between system medium and air free space,
      wherein the repeaters and transponders are of regenerative type having at least one superregenerative circuit equipped with selectivity arrangements for both input and output signals, wherein the repeaters and transponders are capable of selecting frequency bands generated by the superregenerative circuit, by which bandpass-analogous characteristics of the repeaters and transponders are adapted to conform with selectivity requirements.

2. The analogue repeater and transponder system according to claim 1, wherein at least one of the repeaters is arranged to substantially maintain system information bandwidth.

3. The analogue repeater and transponder system according to claim 1, wherein at least one of the repeaters is adapted to high frequency carriers from high frequency through upper microwave frequencies.

4. The analogue repeater and transponder system according to claim 1, wherein at least one repeater is able to operate as a one-port amplifier.

5. The analogue repeater and transponder system according to claim 1, wherein at least one repeater is able to operate as a two- or multiple-port amplifier designated to work with isolation between input and output signals, that is no larger than the amplifier gain.

6. The analogue repeater and transponder system according to claim 1, wherein at least one of the repeaters is arranged to maintain signal dynamic range for the input signals and for the output signals and to substantially maintain intrinsic signal dynamic range of the repeater when connected to the transmission medium.

7. The analogue repeater and transponder system according to claim 1, wherein at least one repeater is able to produce an amplified version of the input signal in the same frequency band as the input signal with no frequency shifting while substantially maintaining the input signal dynamic range.

8. The analogue repeater and transponder system according to claim 1, wherein the repeater and transponder large signal gains exhibit mainly any of white and non-systematic noise in the output signal frequency band with no signal present in the input frequency band.

9. The analogue repeater and transponder system according to claim 1, wherein at least one repeater is able to produce an amplified version of the input signal and to frequency shift the frequency spectrum of the input signal to an output signal frequency spectrum, thereby attenuating interference imposed on the input signal, to substantially maintain input signal dynamic range and repeater dynamic range.

10. The analogue repeater and transponder system according to claim 1, wherein at least one repeater is arranged so as to separate direction of a transmitted signal in the transmission medium and direction of the received signal in the transmission medium, by means of any of directivity couplers and directivity and directional couplers.

11. The analogue repeater and transponder system according to claim 1, wherein at least one repeater is arranged so as to accomplish directivity in the medium with simple directional couplers for at least one of the input signal and the output signal, made up of any of a transmission line and inductive and capacitive couplings.

12. The analogue repeater and transponder system according to claim 1, wherein at least one repeater is arranged so as to shift frequency spectra of information signals to any number of different frequency spectra to maintain signal dynamic range throughout the transmission medium is used, said frequency spectrum shifting possibly being repeated and the frequency spectra possibly being reused along the transmission medium in use, in any suitable order.

13. The analogue repeater and transponder system according to claim 1, wherein any number of repeaters using the same carrier frequency for input signal and output signal is used and utilization of high carrier frequency is allowed, where each repeater can be inserted at any physical position in a transmission medium where the attenuation of the medium at such frequencies is utilized to assist attenuation of signal echo interference, utilization of large signal dynamic range and maintenance of bandwidth.

14. The analogue repeater and transponder system according to claim 1, wherein at least one repeater carrier an on-board short range wireless interface.

15. The analogue repeater and transponder system according to claim 1, wherein at least one repeater is arranged in such a manner that it, in addition to repeating signals, also receives information and treats the information intelligently, and also being arranged so as to be able to transmit intelligent information.

16. The analogue repeater and transponder system according to claim 1, wherein at least one repeater is arranged to be coupled to the transmission medium using any of an antenna, a transmission line, an inductive coupling, a capacitive coupling, a galvanic coupling and any combination of these.

17. The analogue repeater and transponder system according to claim 1, wherein at least one repeater is arranged to be powered by hosting infrastructure using any of an antenna, an inductive coupling, a capacitive coupling, a galvanic coupling, an optical coupling and any combination of these.

18. The analogue repeater and transponder system according to claim 1, wherein at least one repeater is coupled to any of asymmetrically and symmetrically to a transmission medium comprising an infrastructure including at least one of a power line, a signal cable, a non-signal cable, and at least one metal wire constituting any of an asymmetrical and symmetrical transmission line.

19. The analogue repeater and transponder system according to claim 1, wherein at least one repeater is coupled asymmetrically to an infrastructure resembling at least one metal wire or line constituting any of an asymmetrical transmission line with radiation losses and a wandering wave antenna, and which may have any ground reference or may have earth as ground surface.

20. The analogue repeater and transponder system according to claim 1, wherein at least one repeater is coupled symmetrically to an infrastructure resembling any of
   at least two metal wires or lines constituting a symmetrical transmission line with radiation losses,
   a wandering wave antenna, and
   a leaky transmission line.

21. The analogue repeater and transponder system according to claim 1, wherein at least one repeater is coupled to an infrastructure resembling metal wire or line constituting a Lecher Wire transmission line by using high frequency carriers at very short wavelengths to support very wide bandwidths any of unidirectionally and bidirectionally.

22. The analogue repeater and transponder system according to claim 1, wherein the individual repeater is adaptable to any modulation type or any mixture of modulation type including but not limited to QPSK, QAM, QFDM, OFDM, DSSS, FSK, PSK, AM, FM, PM either in existing high frequency carrier format or converted to high frequency carrier format.

23. The analogue repeater and transponder system according to claim 1, wherein at least one repeater is adaptable to any transfer protocol system or layer or mixture hereof including but not limited to DOCSIS x.x, EuroDOCSIS x.x, IEEE802.11A, IEEE802,11B, IEEE802.11G IEEE802.3x, GSM, GPRS, UMTS, TETRA, Bluetooth.

24. The analogue repeater and transponder system according to claim 1, wherein at least one repeater using solid state optical technology is coupled to an optical waveguide or transmission line to maintain system dynamic range, communication range and communication bandwidth for signals on optical wavelengths.

25. A repeater or transponder for analogue repeater and transponder system for any of wireless, wire and waveguide infrastructure based digital networks for at least one transmission medium, comprising:
   at least one of at least one repeater and at least one transponder and
      where each repeater/transponder has at least one port for connection via signal coupler arrangements to the transmission medium for signal reception and transmission,
      where each of the repeaters and transponders is of analogue type with positive and large signal gain applicable to wide bandwidth uses and implemented using any of solid state components and solid state integrated circuitry, and
      where selectivity requirements are adapted to any of information bandwidth and quench frequency or ideal interference isolation between system medium and air free space,
      wherein the repeater and transponder are of regenerative type having at least one superregenerative circuit equipped with selectivity arrangements for both input and output signals, wherein the repeaters and transponders are capable of selecting frequency bands generated by the superregenerative circuit, by which band-pass analogous characteristics of the repeaters and transponders are adapted to conform with selectivity requirements.

26. The repeater or transponder according to claim 25, further comprising a quench oscillator or amplifier with at least one quenching frequency higher in frequency than the highest frequency of the information bandwidth, for accomplishing regenerative wideband signal gain dynamic range.

27. The repeater or transponder according to claim 25, further comprising a quenched oscillator or quenched amplifier with at least one quenching frequency which is lower in frequency than the lowest frequency in the information signal, for accomplishing regenerative wideband signal gain dynamic range.

28. The repeater or transponder according to claim 25, wherein two or more quenched oscillators or quenched amplifiers are interconnected in parallel fashion to work as one amplifier using synchronized quenching, to produce at least one of an increase of dynamic range and an increase of bandwidth, and to accomplish regenerative wideband signal gain dynamic range.

29. The repeater or transponder according to claim 25, wherein two or more quenched oscillators or quenched amplifiers are interconnected in serial or cascaded fashion to work as one amplifier using synchronized quenching, to produce at least one of an increase of dynamic range and an increase of bandwidth, and to accomplish regenerative wideband signal gain dynamic range.

30. The repeater or transponder according to claim 25, wherein the repeater or transponder is able to operate as a one-port amplifier.

31. The repeater or transponder according to claim 25, wherein the repeater or transponder is able to operate as a two- or multiple-port amplifier designated to work with isolation between input and output signals that is no larger than the amplifier gain.

32. The repeater or transponder according to claim 25, wherein the repeater or transponder is able to produce an amplified version of the input signal in the same frequency band as the input signal with no frequency shifting while maintaining input signal dynamic range.

33. The repeater or transponder according to claim 25, wherein the repeater or transponder is able to produce an amplified version of the input signal and to frequency shift the frequency spectrum of the input signal to an output signal frequency spectrum, thereby attenuating interference imposed on the input signal, to substantially maintain input signal dynamic range and repeater dynamic range.

34. The repeater or transponder according to claim 25, further comprising a quenched oscillator or quenched amplifier with additional components and circuits included in a quench circuit design to reduce harmonics of a quench signal within the received signal pass-band limiting the repeater dynamic range, thereby accomplishing regenerative wideband signal gain dynamic range.

35. The repeater or transponder according to claim 25, further comprising a quenched oscillator or quenched amplifier where quenching on the output port of a transistor or amplifier of a quenched circuit is used to reduce harmonics of a quench signal within the received signal passband limiting the repeater dynamic range while also allowing any of synchronizing and locking of the quench signal, thereby accomplishing regenerative wideband signal gain dynamic range.

36. The repeater or transponder according to claim 25, further comprising a quenched oscillator or quenched amplifier where at least one quench generator constitutes a function generator producing any quench signal form to improve repeater dynamic range, thereby accomplishing regenerative wideband signal gain dynamic range.

37. The repeater or transponder according to claim 25, further comprising a quenched oscillator or quenched amplifier where a secondary quench signal is introduced to allow wide dynamic range and bandwidth at any frequency passband determined by at least one high frequency bandpass filter, thereby accomplishing regenerative wideband signal gain dynamic range.

38. The repeater or transponder according to claim 25, wherein the repeater or transponder for large signal gains exhibits mainly any of white and non-systematic noise in the output signal frequency band with no signal present in the input frequency band.

* * * * *

UNITED STATES PATENT AND TRADEMARK OFFICE
CERTIFICATE OF CORRECTION

PATENT NO. : 6,946,989 B2
DATED : September 20, 2005
INVENTOR(S) : Geir Monsen Vavik It is certified that error appears in the above-identified patent and that said Letters Patent is hereby corrected as shown below:

Title page,
Item [30], Foreign Application Priority Data, delete "0192/01" and insert -- 0132/01 --.

Signed and Sealed this

Twenty-third Day of May, 2006

JON W. DUDAS
*Director of the United States Patent and Trademark Office*